US012613777B2

(12) United States Patent
Zhou et al.

(10) Patent No.: US 12,613,777 B2
(45) Date of Patent: Apr. 28, 2026

(54) MEMORY SYSTEMS AND OPERATING METHODS THEREOF, READABLE STORAGE MEDIUMS

(71) Applicant: Yangtze Memory Technologies Co., Ltd., Wuhan (CN)

(72) Inventors: Teng Zhou, Wuhan (CN); Dezhi Yang, Wuhan (CN); Xiao Shao, Wuhan (CN)

(73) Assignee: Yangtze Memory Technologies Co., Ltd., Wuhan (CN)

( * ) Notice: Subject to any disclaimer, the term of this patent is extended or adjusted under 35 U.S.C. 154(b) by 0 days.

(21) Appl. No.: 18/790,436

(22) Filed: Jul. 31, 2024

(65) Prior Publication Data

US 2025/0328422 A1 Oct. 23, 2025

(30) Foreign Application Priority Data

Apr. 17, 2024 (CN) .......................... 202410465321.2

(51) Int. Cl.
*G06F 11/10* (2006.01)
*G06F 11/14* (2006.01)

(52) U.S. Cl.
CPC ...... *G06F 11/1076* (2013.01); *G06F 11/1435* (2013.01)

(58) Field of Classification Search
CPC . G06F 11/1076; G06F 11/108; G06F 11/1435

USPC ......................................... 714/6.1, 6.11, 6.24
See application file for complete search history.

(56) References Cited

U.S. PATENT DOCUMENTS

| | | | | | |
|---|---|---|---|---|---|
| 11,189,326 | B1 * | 11/2021 | Guo | ...................... | G11C 7/1057 |
| 2017/0154677 | A1 * | 6/2017 | Lim | ................... | G11C 16/3459 |
| 2022/0076767 | A1 * | 3/2022 | Guo | ................... | G11C 16/3459 |
| 2023/0352107 | A1 * | 11/2023 | Lee | ........................ | G11C 29/52 |
| 2024/0177786 | A1 * | 5/2024 | Park | ................... | G11C 16/0483 |
| 2025/0053312 | A1 * | 2/2025 | Park | ................... | G06F 11/1044 |
| 2025/0140327 | A1 * | 5/2025 | Han | ........................ | G11C 16/10 |

FOREIGN PATENT DOCUMENTS

WO WO-2014039129 A1 * 3/2014 ......... G11C 11/5628

* cited by examiner

*Primary Examiner* — Chae M Ko
(74) *Attorney, Agent, or Firm* — Hanley, Flight & Zimmerman, LLC

(57) ABSTRACT

Some examples of the present application provide a memory system. The memory system includes a memory device and a memory controller coupled to the memory device. The memory device includes a page buffer; the page buffer includes a latch. The memory controller is configured to in response to a program state being incorrect occurring when the memory device performs a program operation, obtain data in the latch. The memory controller is further configured to obtain at least part of recovered data with the obtained data in the latch.

20 Claims, 26 Drawing Sheets in response to a program state error occurring when a memory device of the memory system performs a program operation, obtain data in a latch of a page buffer of the memory device

S100 obtain at least part of recovered data by using the obtained data in the latch

S200

10

20

30

31

32

621

601 in response to a program state error occurring when a memory device of the memory system performs a program operation, obtain data in a latch of a page buffer of the memory device ⟋— S100 obtain at least part of recovered data by using the obtained data in the latch ⟋— S200

| After DPP | L0 | L1 | L2 | L3 | L4 | L5 | L6 | L7 |
|-----------|----|----|----|----|----|----|----|----|
| D1(LP)    | 1  | 0  | 1  | 0  | 1  | 0  | 1  | 0  |
| D2(MP)    | 1  | 0  | 0  | 1  | 1  | 0  | 0  | 1  |
| DC(UP)    | 1  | 1  | 1  | 1  | 0  | 0  | 0  | 0  |

FIG. 13

|     | L0 | L1 | L2 | L3 | L4 | L5 | L6 | L7 |
|-----|----|----|----|----|----|----|----|----|
| L1  | 0  | 1  | 0  | 0  | 0  | 0  | 0  | 0  |
| L2  | 0  | 0  | 1  | 0  | 0  | 0  | 0  | 0  |
| L3  | 0  | 0  | 0  | 1  | 0  | 0  | 0  | 0  |
| L4  | 0  | 0  | 0  | 0  | 1  | 0  | 0  | 0  |
| L5  | 0  | 0  | 0  | 0  | 0  | 1  | 0  | 0  |
| L6  | 0  | 0  | 0  | 0  | 0  | 0  | 1  | 0  |
| L7  | 0  | 0  | 0  | 0  | 0  | 0  | 0  | 1  |

| Level | DS | D1 | D2 | DC |
|-------|----|----|----|-----|
| L0 ~ L4 | 1 | 1 | 1 | Next LP |
| L5 | 0 | 0 | 0 | Next LP |
| L6 | 0 | 1 | 0 | Next LP |
| L7 | 0 | 0 | 1 | Next LP |

FIG. 16

| Level | DS | D1 | D2 | DC |
|-------|-----|---------|-----|---------|
| L0 ~ L5 | 1 | Next LP | 1 | Next MP |
| L6 | 0 | Next LP | 0 | Next MP |
| L7 | 0 | Next LP | 1 | Next MP |

FIG. 17

| Level | DS | D1 | D2 | DC |
|-------|----|----|----|----|
| L0 ~ L6 | 1 | Next LP | Next MP | Next UP |
| L7 | 0 | Next LP | Next MP | Next UP |

FIG. 18

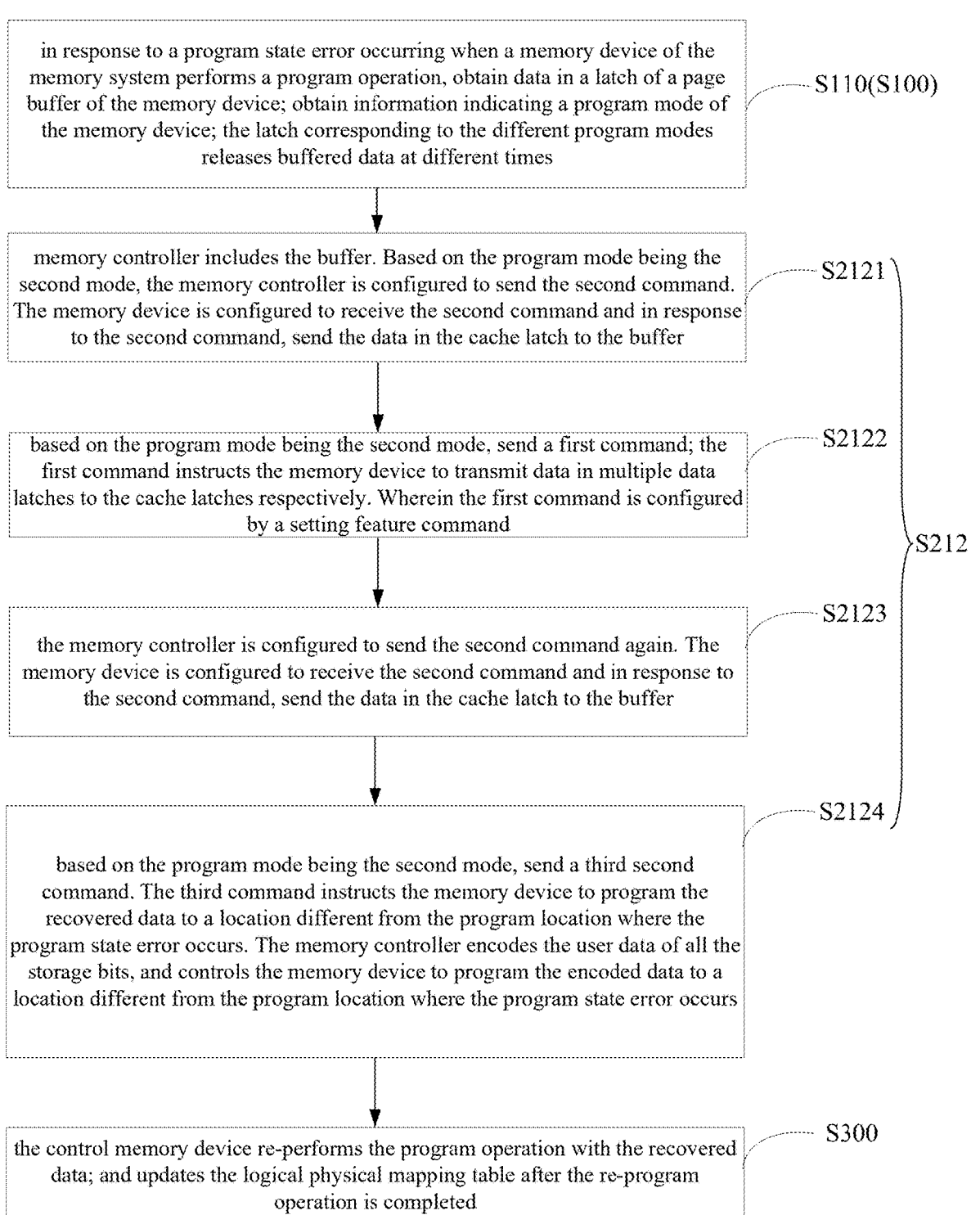

in response to a program state error occurring when a memory device of the memory system performs a program operation, obtain data in a latch of a page buffer of the memory device; obtain information indicating a program mode of the memory device; the latch corresponding to the different program modes releases buffered data at different times — S110(S100)

memory controller includes the buffer. Based on the program mode being the second mode, the memory controller is configured to send the second command. The memory device is configured to receive the second command and in response to the second command, send the data in the cache latch to the buffer — S2121 based on the program mode being the second mode, send a first command; the first command instructs the memory device to transmit data in multiple data latches to the cache latches respectively. Wherein the first command is configured by a setting feature command — S2122 the memory controller is configured to send the second command again. The memory device is configured to receive the second command and in response to the second command, send the data in the cache latch to the buffer — S2123

S212 based on the program mode being the second mode, send a third second command. The third command instructs the memory device to program the recovered data to a location different from the program location where the program state error occurs. The memory controller encodes the user data of all the storage bits, and controls the memory device to program the encoded data to a location different from the program location where the program state error occurs — S2124 the control memory device re-performs the program operation with the recovered data; and updates the logical physical mapping table after the re-program operation is completed — S300

FIG. 21

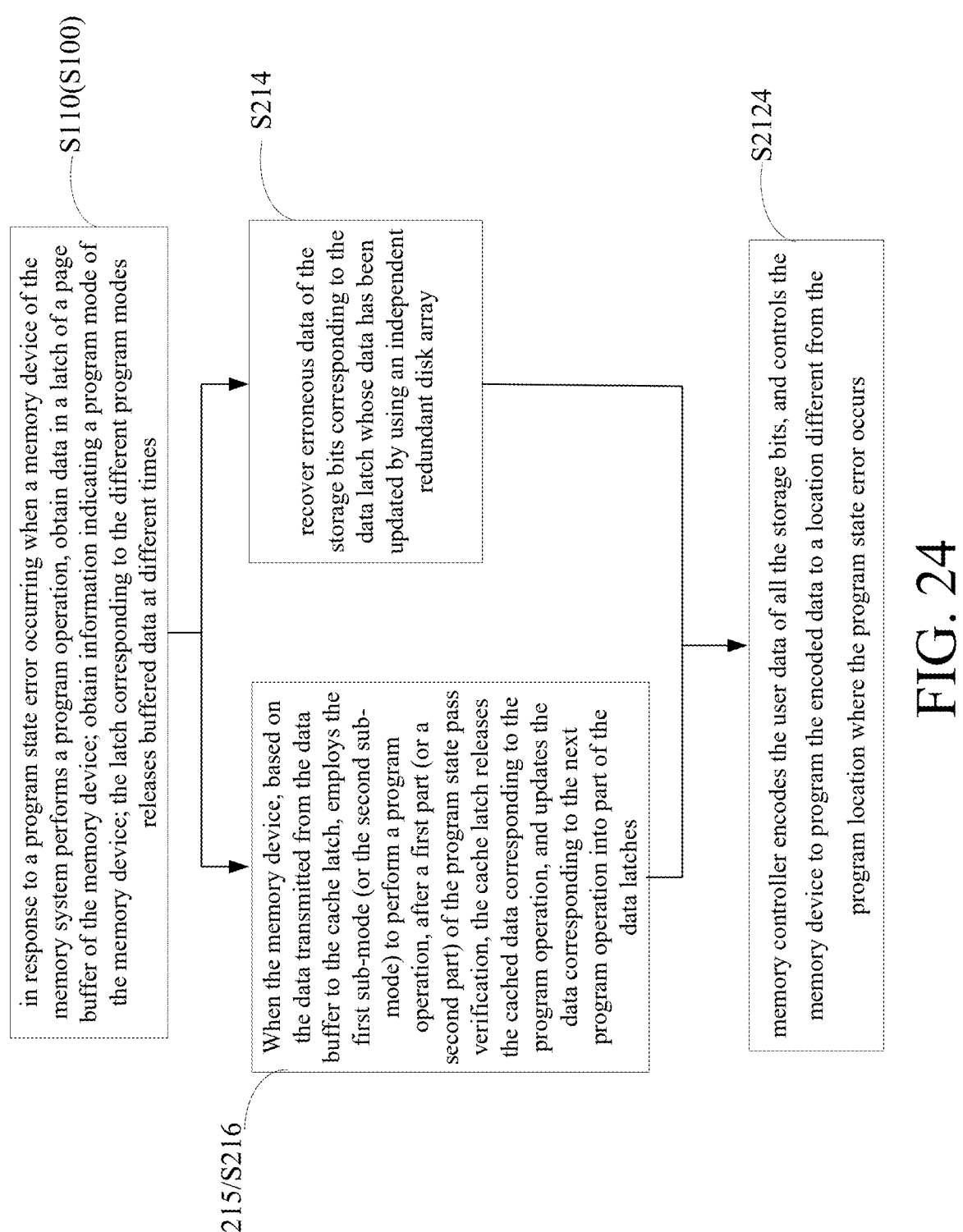

S110(S100)

in response to a program state error occurring when a memory device of the memory system performs a program operation, obtain data in a latch of a page buffer of the memory device; obtain information indicating a program mode of the memory device; the latch corresponding to the different program modes releases buffered data at different times

S214 recover erroneous data of the storage bits corresponding to the data latch whose data has been updated by using an independent redundant disk array

S215/S216

When the memory device, based on the data transmitted from the data buffer to the cache latch, employs the first sub-mode (or the second sub-mode) to perform a program operation, after a first part (or a second part) of the program state pass verification, the cache latch releases the cached data corresponding to the program operation, and updates the data corresponding to the next program operation into part of the data latches

S2124 memory controller encodes the user data of all the storage bits, and controls the memory device to program the encoded data to a location different from the program location where the program state error occurs

FIG. 24

MEMORY SYSTEMS AND OPERATING METHODS THEREOF, READABLE STORAGE MEDIUMS

CROSS-REFERENCE TO RELATED APPLICATION

The present disclosure claims the benefit of priority to China Application No. 202410465321.2, filed on Apr. 17, 2024, the content of which is incorporated herein by reference in its entirety.

FIELD OF TECHNOLOGY

Example of the present disclosure relate to the field of semiconductor technology, and in particular to memory systems and operating methods thereof, readable storage mediums.

BACKGROUND

Semiconductor memories can be roughly divided into two categories, depending on whether they retain stored data when powered off. These two types of semiconductor memories are: volatile memory and non-volatile memory, a volatile memory loses stored data when powered off, while a non-volatile memory retains the stored data when powered off.

In the case that an error exits in a program operation of the non-volatile memory, Redundant Array of Independent Disks (RAID) may be used to recover all incorrect data.

BRIEF DESCRIPTION OF THE DRAWINGS

In the accompanying drawings, similar reference numbers may describe similar components throughout the different views. Similar reference numbers with different letter suffixes may represent different examples of similar components. The accompanying drawings generally illustrate the various examples discussed herein by way of example, and not limitation.

FIG. 13 shows the storage type and storage state of a memory cell provided by an example of the present application;

FIG. 16 is a schematic diagram 1 of the latch of the memory cell shown in FIG. 13 releasing data and storing data;

FIG. 17 is a schematic diagram 2 of the latch of the memory cell shown in FIG. 13 releasing data and storing data;

FIG. 18 is a schematic diagram 3 of the latch of the memory cell shown in FIG. 13 releasing data and storing data;

FIG. 21 is another schematic flowchart 1 of a method for operating a memory system provided by an example of the present application;

FIG. 24 is another schematic flowchart 4 of a method for operating a memory system provided by an example of the present application.

DETAILED DESCRIPTION

Figure 1:
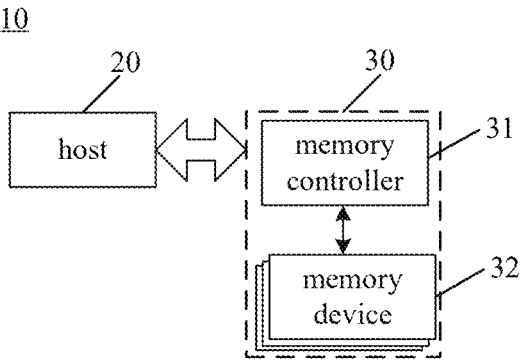
FIG. 1 is a schematic structural diagram of an electronic device provided by an example of the present application.

The technical solution of the present disclosure will be further described in detail below with reference to the accompanying drawings and specific examples of the description.

In examples of the present disclosure, terms "first", "second", etc., are used to distinguish similar objects rather than describing a specific order or sequence.

In examples of the present disclosure, the term "And B are in contact" includes the situation where And B are in direct contact, or the situation where And B are interposed with other components and A is in indirect contact with B.

It should be understood that reference throughout the description to "some examples" or "some examples" means that a particular feature, structure or characteristic related to the example is included in at least one example of the present application. Thus, appearances of "in some examples" or "in some examples" in various places throughout the description are not necessarily referring to a same example. Furthermore, these particular features, structures or characteristics may be combined in any appropriate manner in one or more examples. It should be understood that in various examples of the present application, sequence numbers of the processes described above do not mean the execution order, and the execution order of each process should be determined by its function and internal logic, and should not constitute any limitation to implementation process of examples of the present application. The serial numbers of examples of the present application described above are for the purpose of description only, and do not represent the advantages and disadvantages of the examples.

It should be noted that, in this description, the terms "including", "containing" or any other variations thereof are intended to cover a non-exclusive inclusion, such that a process, method, article or device that includes a series of elements includes not only those elements but also other elements not expressly listed or that are inherent to the process, method, article or device. Without further limitation, an element defined by the statement "including a . . . " does not exclude the presence of additional identical elements in a process, method, article, or device that includes that element.

It will be understood that the meanings of "on," "on top of," and "over" in this disclosure should be read in the broadest manner, such that "on" does not only mean "on" something without intervening features or layers in between (e.g., directly on something), but also includes being "on" something with intervening features or layers in between.

It should be noted that although this description is described in terms of implementations, not each implementation only contains an independent technical solution, but this way of describing in the present description is only for the sake of clarity, those skilled in the art should take the description as a whole, and the technical solutions in each example may also be appropriately combined to form other examples that can be understood by those skilled in the art.

RAID is a data backup technology that can combine multiple independent physical disks in different ways to form a disk array (e.g., logical disk), thereby providing higher storage performance and higher reliability than a single disk. Each disk may be viewed as a set of consecutive, non-overlapping, fixed-size segments. RAID stores data through multiple stripes, one stripe includes multiple segments (located on different disks), and one of the multiple segments serves as a parity information block.

In some examples, "disk" refers to a non-volatile memory that persistently stores data, such as a Hard-Disk Drive (HDD), optical disk drive, or solid-state drive (SSD), etc.

In the process of data recovery after a disk in the RAID fails, the data in the failed disk is calculated with one or more parity information blocks set to perform distributed check information on incorrect data, and the data is reconstructed in the hot idle disk or hot idle section to recover the data. For example, a disk in a RAID acts as a hot idle disk; when a disk fails, for the data of each segment on the failed disk, (any section used to save data of) a hot idle disk may be selected for data reconstruction to acquire the recovered data. Alternatively, each disk may reserve some sections as hot idle sections; when a disk fails, for the data of each segment on the failed disk, a hot idle section on another disk may be randomly selected for data reconstruction to acquire the recovered data.

Examples of RAID types include RAID 0, RAID 1, RAID 3, RAID 5 or RAID 6, etc.

However, the reconstruction speed of RAID is related to the number of disks, and the more disks, the faster the reconstruction speed, thus the failure rate of RAID also increases, which reduces the accuracy of RAID data recovery. At the same time, during the data calculation process of RAID, due to large amount of data calculation, more processor (e.g., memory controller) resources are occupied, resulting in the degradation of the memory system.

In order to solve the problems described above, the present application provides a memory system, operating method for a memory system and readable storage medium, which may implement data recovery more quickly and improve the accuracy of the recovered data when the program operation state is wrong.

As shown in FIG. 1, firstly, an example of the present application shows an electronic device 10. As an example, the electronic device 10 may include, but is not limited to a mobile phone, a desktop computer, a laptop computer, a tablet, a vehicle computer, a gaming console, a printer, a positioning device, a wearable electronic device, a smart sensor, a Virtual Reality (VR) device, an Augmented Reality (AR) device, or any other suitable electronic devices having memory device 32 therein.

Please continue to refer to FIG. 1, the electronic device 10 may include a host 20 and a memory system 30.

The host 20 may be a processor of an electronic device 10 (e.g., a Central Processing Unit (CPU)) or a System on Chip (SoC) (e.g., an Application Process (AP)). The host 20 may be configured to send data to or receive data from the memory system 30.

The memory system 30 includes a memory controller 31 and one or more memory devices 32, as well as other integrated circuit structures for signal transmission. The memory controller 31 and one or more memory devices 32 may be integrated and packaged in the same storage medium 40 (see FIGS. 2 and 3). Thus, it is beneficial to apply the memory system 30 to different types of terminal electronic products.

Figure 2:
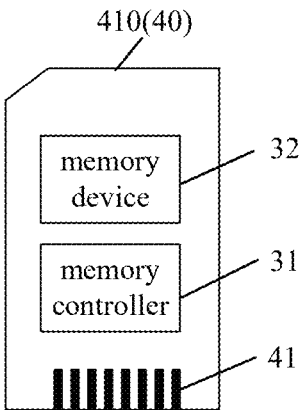
FIG. 2 is a schematic structural diagram of a storage medium provided by an example of present application.
Figure 3:
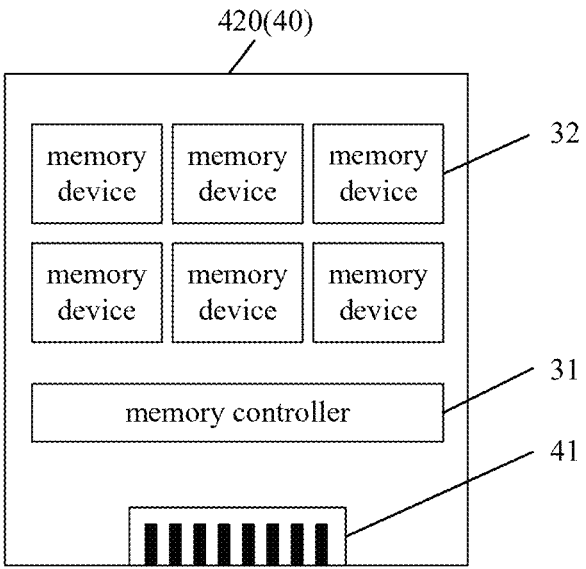
FIG. 3 is a schematic structural diagram of another storage medium provided by an example of present application.

As shown in FIGS. 2 and 3, in some examples, the present application provides a readable storage medium 40. The readable storage medium 40 includes stored computer programs or instructions; the computer program or instructions, when are executed, control the computer-readable storage medium to implement the method for operating the memory system provided in any subsequent example.

The readable storage medium 40 integrates the memory controller 31 and one or more memory devices 32. As an example, types of readable storage medium 40 include: Universal Flash Storage (UFS) or Embedded Multi Media Card (eMMC) and other types of storage devices.

Moreover, the readable storage medium 40 may be integrated into a circuit in a variety of ways, e.g., a single memory device 32 and a memory controller 31 (as shown in FIG. 2) may be integrated to form a memory card 410, or multiple memory devices 32 and memory controller 31 may be integrated to form a SSD 420 (as shown in FIG. 3).

As an example, the memory card 410 may include one or more types of storage devices of a Personal Computer Memory Card International Association (PC) card, a CF card, a Smart Media (SM) card, a memory stick, a Multi-media card (MMC (Multi-Media Card), RS-MMC (Reduced-Size MMC), MMCmicro), a SD card (SD, miniSD, microSD, SDHC (Secure Digital High Capacity)), UFS, etc.

Continuing to refer to FIG. 2, the memory card 410 also includes a memory card connector 41. Memory card connector 41 is configured to couple memory card 410 with a host (e.g., host 20 in FIG. 1). For example, memory card connector 41 includes a gold finger.

Alternatively, continuing to refer to FIG. 3, SSD 420 also includes SSD connector 41. SSD connector 41 is configured to couple SSD 420 with a host (e.g., host 20 in FIG. 1). For example, SSD connector 41 includes a gold finger.

In some examples, the storage capacity and/or operating speed of SSD 420 is greater than the storage capacity and/or operating speed of memory card 410.

The above-mentioned memory controller 31 integrated in the same storage device is coupled to the memory device 32 (and the host 20), and the memory controller 31 is configured to control the memory device 32.

In some examples, the memory controller 31 may be designed for operation in a low duty cycle environment. For example, the memory controller may be designed to operate in Secure Digital (SD) card, Compact Flash (CF) card, Universal Serial Bus (USB) flash drive, or to operate in other medium for use in electronic devices such as personal computer, digital camera, mobile phone, etc. As another example, the memory controller 31 may be designed for operation in a high duty cycle environment, e.g., for operation in an SSD or embedded Multi-Media Card (eMMC). Among them, SSD or eMMC may be used as data storage for mobile devices such as smartphone, tablet, laptop, etc., as well as enterprise storage arrays.

Further, the memory controller 31 may manage data in the memory device 32 and communicate with the host 20. The memory controller 31 may be configured to control operations of such as memory device 32 read, erase, and program; and may also be configured to manage various functions related to data stored or to be stored in memory device 32, including but not limited to bad block management, garbage collection, logical-to-physical address translation, wear leveling, etc.; and may also be configured to process Error Checking and Correction (ECC) on data read from or written to memory device 32.

In addition, the memory controller 31 may also perform any other suitable functions, e.g., formatting the memory device 32, or communicating with external devices (e.g., host 20 in FIG. 1) according to a specific communication protocol. For example, the memory controller 31 may communicate with a host 20 through at least one of various interface protocols. Among them, the interface protocol includes one or more protocols of USB protocol, MMC protocol, Peripheral Component Interconnect (PCI) protocol, Peripheral Component Interconnect Express (PCI-E) protocol, Advanced Technology Attachment (ATA) protocol, Serial ATA protocol, Parallel ATA protocol, Small Computer System Interface (SCSI) protocol, Enhanced Small Disk Interface (ESDI) protocol, Integrated Drive Electronics (IDE) protocol, Fire wire protocol, etc.

The above-mentioned memory device 32 may include, but is not limited to one or more memory of NAND Flash Memory, Vertical NAND Flash Memory, NOR Flash Memory, Dynamic Random Access Memory (DRAM), Ferroelectric Random Access Memory (FRAM), Magnetoresistive Random Access Memory (MRAM), Phase Change Random Access Memory (PCRAM), Resistive Random Access Memory (RRAM) and Nano Random Access Memory (NRAM), etc.

Based on the above description, the present application uses the memory device 32 being a semiconductor memory, e.g., a solid-state electronic device (e.g., a NAND memory) that stores data information produced by a semiconductor integrated circuit process, as an example to describe subsequent examples. The subsequent examples of the present application do not limit the specific internal structures of the memory device 32 and the memory controller 31.

In some examples, in order to facilitate the differentiation of adaptive adjustments made by the memory device 32 and the memory controller 31 when applied to different memory systems 30, e.g., based on the various structures of the memory device 32 exemplified in the foregoing content, and the generation logic of the control instructions output by the memory controller 31 to the memory device 32, the memory device (e.g., a NAND type memory) provided in the following examples of the present application is described with the memory device 60 and the memory controller 51 applied to the memory system 50.

Secondly, in order to solve the problems described above, as shown in FIGS. 4 to 11, in some examples, examples of the present application provide a memory system 50 that can realize data recovery more quickly and improve the accuracy of the recovered data when the program operation state is incorrect.

Figure 4:
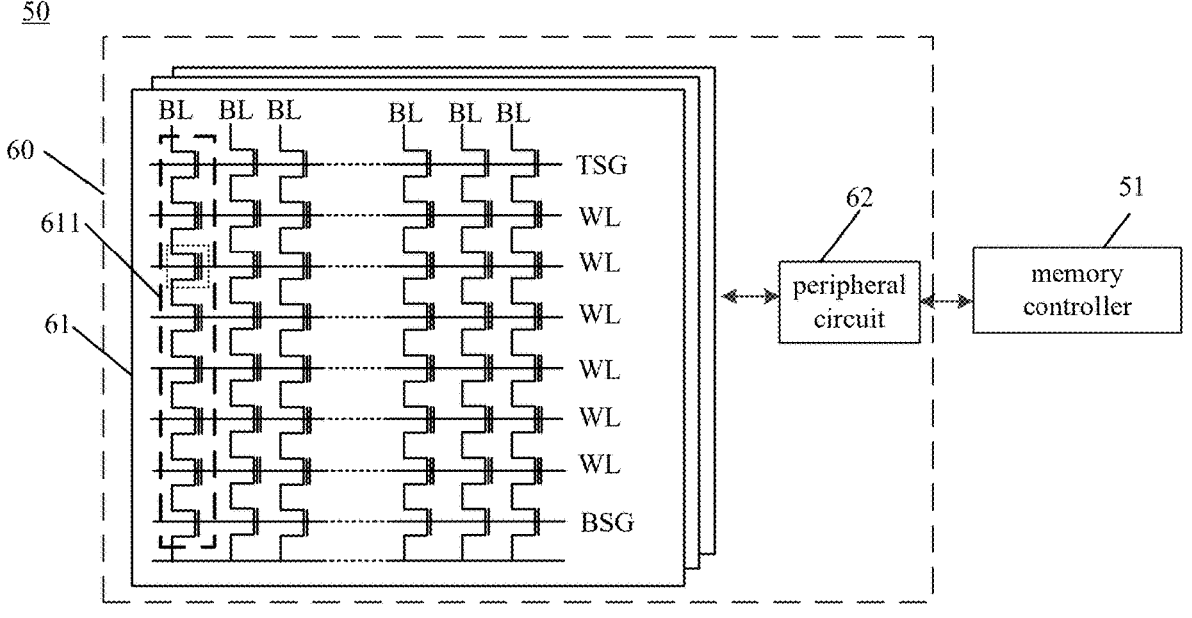
FIG. 4 is a schematic structural diagram 1 of a memory system provided by an example of the present application.

As shown in FIG. 4, memory system 50 includes memory device 60 and memory controller 51 coupled to memory device 60.

The memory device 60 may include a memory cell array 61 and a circuit structure such as a peripheral circuit 62 coupled to the memory cell array 61.

The memory cell array 61 is coupled to multiple bit lines BL. As an example, the memory cell array 61 may be a NAND flash memory cell array. For example, the memory cell array 61 is a circuit structure arranged in the form of an array arrangement of NAND memory strings 611. Each NAND memory string 611 extends vertically on the substrate. In some examples, each NAND memory string 611 may includes multiple memory cells coupled in series and stacked vertically. Wherein each memory cell transmits signals in a state that maintains a continuous analog value (e.g., voltage or charge), and the analog value of the memory cell depends on the number of electrons captured within the memory cell area.

For example, each memory cell in the memory cell array 61 may be a floating gate type memory cell including a floating gate transistor, or a charge trap type memory cell including a charge trap transistor. The present application does not limit this.

In some examples, the storage types of the memory cells described above include any one of Single Level Cells (SLC), Multi Level Cells (MLC), Triple Level Cells (TLC) and Quad Level Cells (QLC), etc.

For example, each memory cell of SLC may store one bit of data and have two possible storage states, e.g., a first storage state and a second storage state. Wherein, the first storage state (e.g., "0") corresponds to a first threshold voltage range, and the second storage state (e.g., "1") corresponds to a second threshold voltage range. Thus, the second storage state (e.g., "1") serves as the erase state, and the first storage state (e.g., "0") serves as the program state.

As another example, each memory cell of the MLC may store two bits of data and has four possible storage states, e.g., a first storage state, a second storage state, a third storage state, and a fourth storage state. Wherein, the first storage state (e.g., "00") corresponds to a first threshold voltage range, the second storage state (e.g., "01") corresponds to a second threshold voltage range, the third storage state (e.g., "10") corresponds to a third threshold voltage range, and the fourth storage state (e.g., "11") corresponds to a fourth threshold voltage. Thus, the fourth storage state (e.g., "11") serves as the erase state; the first storage state (e.g., "00"), the second storage state (e.g., "01") and the third storage state (e.g., "10") serve as program state.

Similarly, each memory cell of TLC may store three bits of data and have eight possible storage states. The eight storage states respectively correspond to eight threshold voltage ranges, and the specific storage states will not be repeated here. Among them, one of the eight threshold voltage ranges serves as the erase state (e.g., "111"), and the remaining seven threshold voltage ranges serve as the program state. And, each memory cell of QLC may store four bits of data and have sixteen possible storage states. The sixteen storage states respectively correspond to sixteen threshold voltage ranges, and the specific storage states will not be repeated here. Among them, one of the sixteen threshold voltage ranges serves as the erase state (e.g., "1111"), and the remaining fifteen threshold voltage ranges serve as the program state.

Continuing to refer to FIG. 4, the peripheral circuit 62 described above may be coupled to the memory cell array 61 through the Bit Line (BL), the Word Line (WL), the Source Select Gate (SSG) and the Drain Select Gate (DSG). The peripheral circuit 62 is configured to apply a voltage signal and/or a current signal to each target memory cell via bit line BL, a word line WL, a source SL, a source select gate SSG or a drain select gate DSG, etc., and sense a voltage signal and/or a current signal from each target memory cell to implement logic operations (e.g., program, read, or write operation) of the memory cell array 61.

Figure 5:
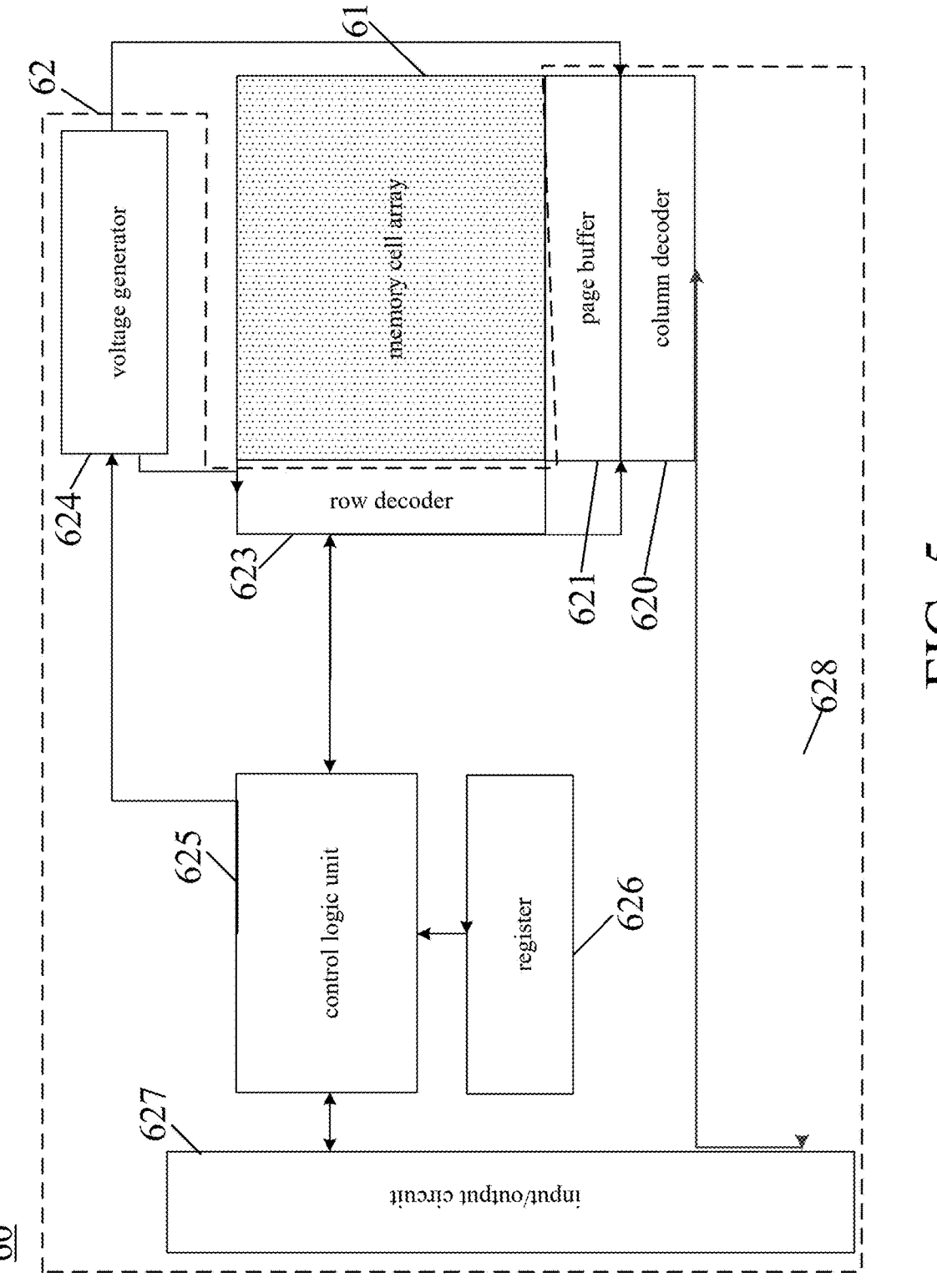
FIG. 5 is a schematic structural diagram of peripheral circuit of a memory provided by an example of the present application.

By way of example, the peripheral circuit 62 includes various types of circuit structures formed using Metal-Oxide-Semiconductor (MOS) transistors. For example, as shown in FIG. 5, the peripheral circuit 62 may include various circuit structures such as row decoder/word line driver 620, Page Buffer (PB)/sense amplifier 621, a column decoder/bit line driver 623, voltage generator 624, control logic unit 625, latch circuit 626, interface 627 and data bus 628, etc.

Figure 6:
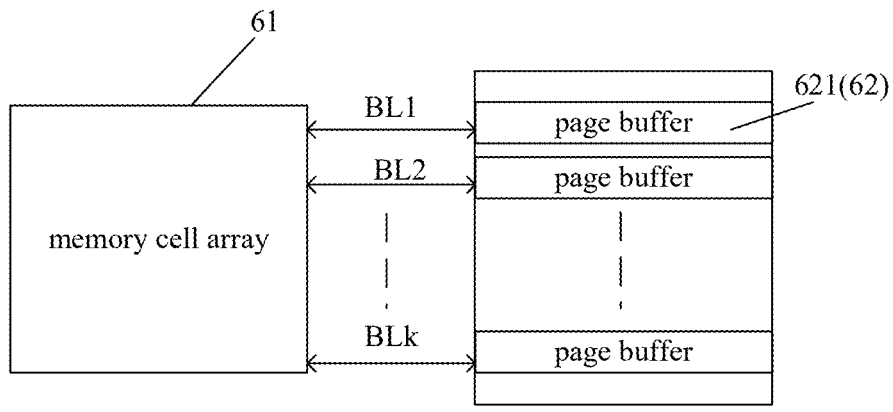
FIG. 6 is a schematic structural diagram of page buffer bank of a memory system provided by an example of the present application.

The page buffer 621 is a bridge for converting binary data (0/1) of external logic into analog signals (threshold voltage/number of electrons) in the memory device 60. Further, as shown in FIG. 6, the peripheral circuit 62 may include a page buffer group composed of multiple page buffers 621. The page buffer group may be coupled to the memory cell array 61 via multiple bit lines (BL1 to Blk). For example, as shown in FIG. 6, multiple page buffers 621 may be respectively coupled to the memory cell array 61 via corresponding bit lines BL1 to BLk and configured to control the memory cells on the memory string 611 (see FIG. 4) to perform data program and read in response to the target signal.

Based on the content described above, in some examples, the page buffer 621 of the peripheral circuit 62 includes multiple latches 6210, and the multiple latches 6210 include a sense latch (S Latch), a low voltage latch (LVT Latch), data latch (D Latch), and cache latch (C Latch).

Among them, the sense latch S Latch may be used to store inhibit information and verification information from verification operations.

The cache latch (C Latch) is used to exchange data with the outside, e.g., the external data is first transmitted to the cache latch (C Latch), and then transmitted to the sense latch S Latch through the cache latch (C Latch). As another example, the data in the sense latch (S Latch) is transmitted to the cache latch (C Latch), and then transmitted to the outside through the cache latch (C Latch). The external may be the memory controller 31 or the host 20, etc. As another example, the cache latch (C Latch) may also be used for other functions, e.g., for temporarily storing verification information.

The data latch (D Latch) may be used to latch the data of the specified page of the memory cell. For example, the specified page includes one or more types of the lower page LP, the middle page MP, and the upper page UP.

A low voltage latch (LVT Latch) may be used to store inhibit information and adjusted verification information from the verification operation.

In some examples, depending on the storage type of the memory cell, the number of latches 6210 of the page buffer 621 may also be different.

For example, each memory cell of the SLC may include three latches 6210; wherein the three latches 6210 include a sense latch (S Latch), a low voltage latch (LVT Latch), and a cache latch (C Latch). Among them, the cache latch (C Latch) may be used to latch the data of the memory cell.

As another example, each memory cell of the MLC may include four latches 6210; wherein the four latches 6210 include a sense latch (S Latch) 6211, a low voltage latch (LVT Latch), a Data latch (D Latch), and a cache latch (C Latch). Among them, the data latch (D Latch) may be used to latch the lower page (LP) data of the memory cell, and the cache latch (C Latch) may be used to latch the upper page (UP) data of the memory cell.

As yet another example, each memory cell of the TLC may include five latches 6210; wherein the five latches 6210 include a sense latch (S Latch) 6211, a low voltage latch (LVT Latch), two data latches (D Latch), and a cache latch (C Latch). Among them, one data latch (D Latch) may be used to latch the lower page (LP) data of the memory cell, and the other data latch (D Latch) may be used to latch the middle page (MP) data of the memory cell, the latch (C Latch) may be used to latch the upper page (UP) data of the memory cell.

As still another example, each memory cell of the QLC may include six latches 6210; wherein the four latches 6210 include a sense latch (S Latch) 6211, a low voltage latch (LVT Latch), three Data latches (D Latch), and a cache latch (C Latch). Among them, one data latch (D Latch) may be used to latch the lower page (LP) data of the memory cell, one data latch (D Latch) may be used to latch the middle page (MP) data of the memory cell, another data latch (D Latch) may be used to latch the upper page (UP) data of the memory cell, and the cache latch (C Latch) may be used to latch another upper page (XP) data of the memory cell.

Figure 7A:
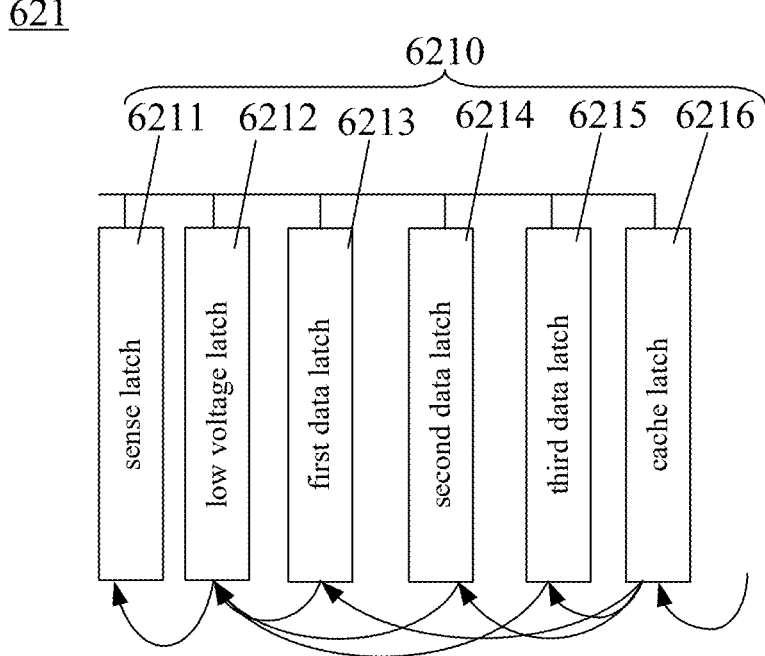
FIG. 7A is a schematic structural diagram of multiple latches of the page buffer provided by an example of the present application.

In addition, based on the type and number of latches 6210 included in the storage type of the memory cell, the number of latches 6210 may also be increased according to actual needs (e.g., the number of D Latch is increased), and the present application does not impose specific restrictions on this. As shown in FIG. 7A, the following example takes the storage type of the memory cell being QLC and including six latches 6210 as an example for illustrative description. For example, the page buffer 621 includes a sense latch (S Latch) 6211, a low voltage latch (LVT Latch) 6212, a first data latch (D Latch) 6213, a second data latch (D Latch)) 6214 and the third data latch (D Latch) 6215, and the cache latch (C Latch) 6216.

For example, the 4-bit data of a QLC memory cell is stored in the first data latch (D Latch) 6213, the second data latch (D Latch) 6214 and the third data latch (D Latch) 6215, and in the cache latch (C Latch) 6216, respectively, these 4-bit data sequentially transmitted to the sense latch 6211 through the low-voltage latch 6212, and the data program state is verified to obtain a verification result. After the program states of all storage bits pass the verification, the cache latch 6216 releases the buffered data.

Figure 8:
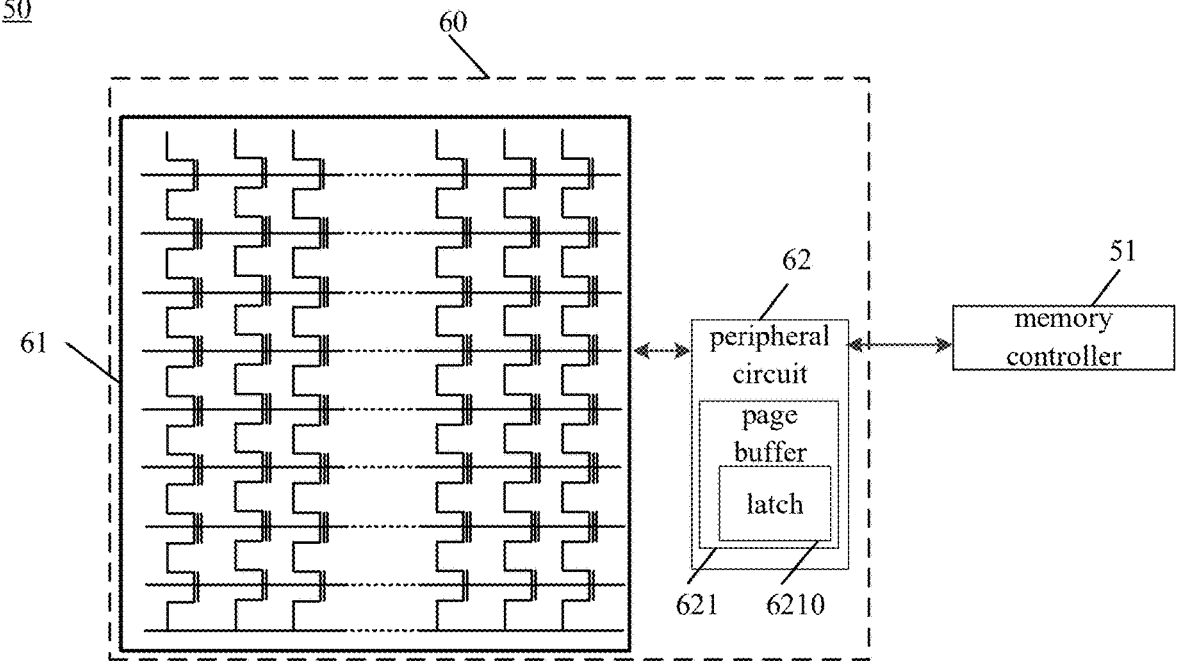
FIG. 8 is a schematic structural diagram 2 of a memory system provided by an example of the present application.

Based on this, as shown in FIG. 8, in some examples, memory device 60 includes page buffer 621. The page buffer 621 includes a latch.

The memory controller 51 is configured to: in response to a program state being incorrect occurring when the memory device 60 performs a program operation, obtain data in the latch. At least part of recovered data re_Data is obtained with the obtained data in the latch.

In some examples, "program state error" includes the state of the memory device when part of the data is not written into the cache or is lost during the process of programming (writing) data. And, "recovered data" refers to the data obtained by reconstructing the data that was not stored in the buffer when an error occurred in the program state, at least one of the size, type and other attribute values of the data is the same as the data where the error occurred and may be used by subsequent operations, in the examples provided in the present application, "recovered data" represents refers to data recovered from data not stored in a buffer, which is distinguished from the original data, so as to facilitate a clearer understanding of the state changes of the data during the process of the memory controller 51 storing data into the memory device 60. Moreover, it is distinguished from the data that is the same as the original data obtained by subsequent encoding of the recovered data.

Compared with the method of only using the memory controller to control RAID to recover the incorrect data in the memory device 60, the present application can use the memory controller 51 to directly recover the incorrect data of the memory device 60, e.g., the memory controller 51 obtains at least a part of the recovered data by directly obtaining and utilizing the data in the latch in the memory device 60, which not only reduces the resource usage of the memory controller 51, but also requires less or no disks to reconstruct data, thus reducing the usage of other storage space, moreover, short delay helps to improve the speed of data recovery and reduce the time required during data transmission thereby improving the accuracy of recovered data.

Figure 9:
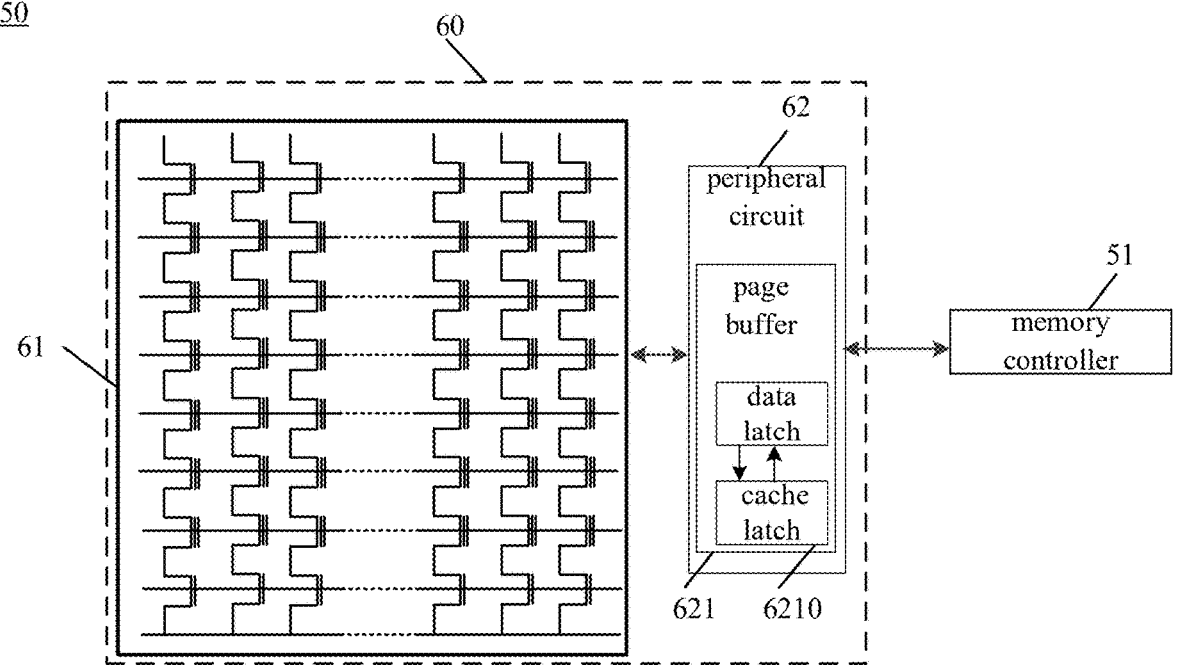
FIG. 9 is a schematic structural diagram 3 of a memory system provided by an example of the present application.

In some examples, as shown in FIG. 9, the memory device 60 further includes a memory cell storing multiple bits. The page buffer 621 also includes one or more data latches (D Latch) and a cache latch (C Latch). Among them, a data latch (D Latch) is configured to cache one bit of data to be written to the memory cell. The cache latch (C Latch) is configured to cache data interacted between the memory device 60 and the memory controller 51.

As an example, the memory cell with multiple storage bits is QLC, as shown in FIG. 7A, and its page buffer 621 includes a sense latch (S Latch) 6211, a low voltage latch (LVT Latch) 6212, three data latches (D Latch) 6213, 6214 and 6215, and a cache latch (C Latch) 6216. The three data latches (D Latch) 6213, 6214 and 6215, and the cache latch (C Latch) 6216 each stores one bit of data.

The memory controller 51 is configured to: before obtaining the data in the latch, obtain information for representing a program mode of the memory device 60; the latches corresponding to the different program modes release buffered data at different times; and according to the program mode, determine whether to control the memory device 60 to transmit the data in the data latch (D Latch) to the cache latch (C Latch), and the data transmitted to the cache latch (C Latch) is obtained. Wherein, before the data in the data latch (D Latch) is transmitted to the cache latch, a part of the recovered data re_Data is acquired with the buffered data in the cache latch (C Latch).

In the case of the program state error described above, data corresponding to the program operation (e.g., the data to be read by the read operation) is not stored in the buffer 52 (see FIG. 10), therefore, it is required to obtain the un-stored data from the latch 6210 and recover it into the buffer 52. The "program mode" is determined based on different processes that can obtain un-stored data from different latches of the memory device 60, e.g., the process in which all data not stored in the buffer 52 may be obtained from the cache latch (C Latch) corresponds to one program mode. The process in which data not stored in the buffer 52 may be obtained from the cache latch (C Latch) and the data latch (D Latch) corresponds to another program mode. Since the data to be recovered in the buffer 52 is still in different latches 6210, different operations need to be performed to obtain the data in all latches 6210 in different program modes. Thus, for different location state of the data that is currently not stored (e.g., the data to be recovered), different operations of the memory controller 51 performing data recovery in response to different program modes are determined. For example, all the data to be recovered has been cached in the cache latch (C Latch), and the memory controller 51 responds to the command of the first mode Model1; or part of the data to be recovered has been stored in the data latch (D Latch), the other part is cached into the cache latch (C Latch), and the memory controller 51 responds to the command of the second mode Model2. Different program modes generate different commands, and the memory controller 51 performs corresponding operations in response to the different commands.

Thus, determining different operating modes through different program modes and selecting a more appropriate data recovery method may improve the speed of data recovery and reduce the time consumed by data recovery. Some examples are provided below to illustrate the two data recovery processes in the first mode Model1 and the second mode Model2.

In some examples, the memory controller is configured to: based on the program mode being a first mode Model1, directly obtain the data in the cache latch (C Latch) and acquire at least a part of the recovered data re_Data.

Figure 10:
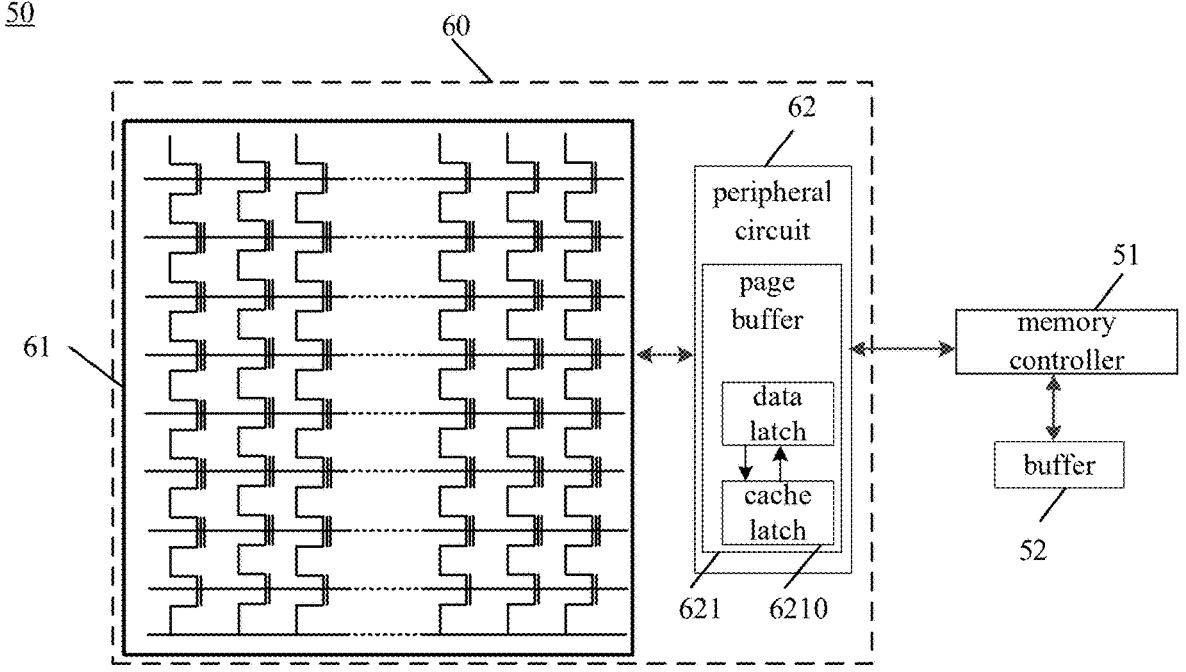
FIG. 10 is a schematic structural diagram 4 of a memory system provided by an example of the present application.

In some examples, as shown in FIG. 10, the memory controller 51 includes buffer 52.

In some examples, the buffer 52 may be located in the memory controller 51, or may be an external buffer that communicates with the memory controller 51 (the external buffer is located in the memory system 30), as long as it is able to implement data caching and data interaction between the memory controller and the memory devices, and the examples provided in the present application do not specifically limit the method of driving the buffer 52. The following example takes the buffer 52 located in the memory controller 51 as an example for illustration.

Based on the program mode being the first mode Model1, the memory controller 51 is configured to send the second command. The memory device 60 is configured to receive the second command and in response to the second command, send the data in the cache latch (C Latch) to the buffer 52.

For example, the program mode of the memory device 60 is the first mode Model1; when a program state being incorrect occurs during the program operation of the memory device 60, the data in the cache latch (C Latch) is all of the data corresponding to the program operation.

The memory controller 51 is configured to acquire the recovered data re_Data of all storage bits of the memory cell based on the data directly obtained from the cache latch (C Latch).

Then, when the memory device 60 employs the first mode Model1 to perform a program operation, after all program states pass verification, the cache latch (C Latch) releases the buffered data corresponding to the program operation.

For example, after all program states in the data latch (D Latch) pass verification, the cache latch (C Latch) releases the buffered data corresponding to the program operation. Among them, the data of the cache latch (C Latch) is transmitted to the sense latch through the data latch (D Latch) for program state verification. For example, the program state of the data in multiple data latches (D Latch) may be verified in sequence, and after the verification is passed, the cache latch (C Latch) releases the buffered data and stores data corresponding to a next program operation (e.g., a fine program operation or an operation to store the storage bit of the next memory cell), and then transmits the data to part of the data latch (D Latch). Moreover, the data that passes the verification may be transmitted to the buffer 52.

If the program state of the data in a certain data latch (D Latch) does not pass the verification, the unreleased data in the cache latch (C Latch) is retransmitted to the data latch (D Latch), and then verification is performed again.

In some examples, the storage type of the memory cell is QLC, and the memory cell includes 4 bits of storage bit LP, MP, UP, and XP. Page buffer 621 includes cache latch 6216. The data in the cache latch (C Latch) is all of the data corresponding to the program operation.

Based on the program mode being the first mode Model1, the memory controller 51 is configured to send the second command. The memory device 60 is configured to receive the second command and in response to the second command, send the data in the cache latch (C Latch) 6216 to the buffer 52. Then, the memory controller 51 uses the obtained data to acquire the recovered data re_Data corresponding to the storage bit.

In other examples, based on the program mode being the second mode Model2, the memory device 60 is controlled to transmit data in multiple data latches (D Latch) to the cache latch (C Latch) respectively, and obtain the data transmitted from one or more data latches (D Latch) to the cache latch (C Latch), and acquire a part of the recovered data re_Data. Moreover, before the data in the data latch D Latch is transmitted to the cache latch, a part of the recovered data re_Data is acquired with the buffered data in the cache latch (C Latch).

The memory controller 51 described above is configured to send first second command based on the program mode being the second mode Model2.

The memory device 60 is configured to receive the first command and in response to the first command, transmit data in the multiple data latches (D Latch) to the cache latch (C Latch) respectively.

Wherein the first command is configured by a setting feature command. For example, the setting feature command may include arbitration, power management, logical address range type, temperature threshold, error recovery, volatile write notification cache, interrupt engagement, interrupt appropriate configuration, write atomic normal, asynchronous event configuration, automatic power state transition, host memory buffer, command set specific, wall clock time or timestamp corresponding to absolute time, supported protocol versions, etc. In some examples provided the present application, a first command is sent by the memory controller 51 for "error recovery" based on a setting feature command.

In some examples, the memory controller 51 includes buffer 52. Based on the program mode being the second mode Model2, the memory controller 51 is configured to send the second command. The memory device 60 is configured to receive the second command and in response to the second command, send the data in the cache latch (C Latch) to the buffer 52.

The "second command" may be used to send the data in the cache latch (C Latch) to the buffer 52. The "second command" may be an instruction that applies various program modes without being limited to the type of each program mode, or may be different instructions in different program modes but have the same function. This is not limited in examples provided in the present application and may be set according to actual demands.

Thus, the data in the cache latch (C Latch) may first be sent to the buffer 52 in response to the "second command", then in response to the "first command", the data in the multiple data latches (D Latch) are transmitted to the cache latch (C Latch) respectively, thereby implementing data exchange with external electronic components through the cache latch (C Latch).

Considering that the data located in the data latch (D Latch) may reflect different storage states of the memory cell, the data in these different storage states may be recovered in different ways. The following example implements the recovery method of data in different storage states with the data in the data latch (D Latch) in the second mode Model2.

In some examples, the program mode of the memory device 60 is the second mode Model2. The program operation performed by the memory device 60 includes a multi-pass program operation on a set of the memory cells; when a program state being incorrect occurs during the program operation on the set of the memory cells of the memory device 60, data in a part of the data latches (D Latch) of the multiple data latches (D Latch) has been updated to data corresponding to a pass of program operation next to a current pass in the multi-pass program operation.

The memory controller 51 is configured to: based on the data transmitted from the data latch (D Latch) to the cache latch (C Latch), acquire the recovered data re_Data corresponding to the storage bit of the data latch (D Latch) in which data has not been updated; and recover incorrect data of the storage bit corresponding to the data latch (D Latch) in which data has been updated with an independent redundant disk array RAID.

For example, the program operation performed by the memory device 60 includes a multi-pass program operation on a set of the memory cells, e.g., a multi-pass program operation includes performing a coarse program operation followed by a fine program operation. When a program state being incorrect occurs during the program operation of a group of memory cells of the memory device 60, data of the data latch (D Latch) of some storage bits includes the data on which coarse program has been performed but fine program has not been performed (e.g., the storage bit corresponding to the data latch in which data has not been updated), these data can be directly transmitted from the data latch (D Latch) to the cache latch (C Latch); and the memory controller 51 obtains the data in the cache latch (C Latch) and obtains the recovered data re_Data corresponding to the storage bit. The data in the data latch (D Latch) of another part of the storage bits includes the data on which fine program has been performed (e.g., the storage bit corresponding to the data latch in which data has been updated), these data may be recovered through RAID to acquire the recovered data re_Data corresponding to the storage bit.

Thus, by combining these two data recovery methods, when there is a large amount of un-stored data, compared with data recovery only through RAID, the resource usage of the processor (e.g., a memory controller) is reduced and the time consumed by data recovery is in turn decreased.

As another example, if all of the data in the data latch (D Latch) are data on which fine program operation has been performed, these data can also be directly transmitted from the data latch (D Latch) to the cache latch (C Latch); and the memory controller 51 obtains the data in the cache latch (C Latch) and obtains the recovered data re_Data corresponding to the storage bit.

Thus, RAID may not be used for data recovery, thereby reducing the resource usage of the processor (e.g., memory controller) and usage of other storage space, and compared with data recovery through RAID, the method in this example improves the speed of data recovery and reduces the time consumed by data recovery.

Based on this, in some examples, for the finely programmed data in the above second mode Model2, a sub-mode may be selected based on an amount of data in this part, moreover, the cache latch (C Latch) in different sub-modes releases the buffered data corresponding to the program operation at different times, e.g., different sub-modes are selected according to an amount of data that the cache latch (C Latch) can store, which can reduce the probability of data loss due to the cache latch (C Latch) releasing data faster than the rate of storing data, thereby improving the accuracy and integrity of data recovery.

In some examples, the second mode Model2 includes the first sub-mode Model21 and the second sub-mode Model22.

When the memory device 60 employs the first sub-mode Model21 to perform a program operation, after the verification of a first part of the program states passes, the cache latch (C Latch) releases the buffered data corresponding to the program operation, and updates data corresponding to a next program operation into a part of the data latches (D Latch).

When the memory device 60 employs the second sub-mode Model22 to perform a program operation, after the verification of a second part of the program states passes, the cache latch (C Latch) releases the buffered data corresponding to the program operation, and updates data corresponding to a next program operation into a part of the data latches (D Latch).

After all program states in the data latch (D Latch) pass verification, the cache latch (C Latch) releases the buffered data corresponding to the program operation. Among them, the data of the cache latch (C Latch) is transmitted to the sense latch (S Latch) through the data latch (D Latch) for program state (e.g., threshold voltage distribution range) verification. For example, the program state of the data in multiple data latches (D Latch) may be verified in sequence, and after the verification is passed, the cache latch (C Latch) releases the buffered data and stores data corresponding to a next program operation (e.g., a fine program operation or an operation to store the storage bit of the next memory cell), and then transmits the data to part of the data latch (D Latch). Moreover, the data that passes the verification may be transmitted to the buffer 52.

If the program state of the data in a certain data latch (D Latch) does not pass the verification, the unreleased data in the cache latch (C Latch) is retransmitted to the data latch (D Latch), and then verification is performed again.

For example, the number of program states corresponding to the first part is greater than the number of program states corresponding to the second part. It may be understood that "the number of program states corresponding to the first part" and "the number of program states corresponding to the second part" are used to distinguish the fine-programmed data in different sub-modes, rather than dividing the fine-programmed data into two parts. Different sub-modes may be selected by determining an amount of fine-programmed data.

Thus, when there are a large number of un-stored program states (e.g., the program state of the first part), employing the first sub-mode Model21 for program operations will occupy less resources of the processor (e.g., a memory controller) and increase the speed of data recovery.

Moreover, a time instance corresponding to the first sub-mode Model 21 at which the cache latch (C Latch) releases the buffered data is later than a time instance corresponding to the second sub-mode Model 22 at which the cache latch (C Latch) releases the buffered data. Thus, based on the fact that the number of program states corresponding to the first part is greater than the number of program states corresponding to the second part, the cache latch (C Latch) in the first sub-mode Model21 may cache data for a longer time to ensure that that the data in the cache latch (C Latch) is stored and then released, thereby reducing the probability of data loss and improving the accuracy of data recovery.

In some examples, the storage type of the memory cell includes QLC, including 4 storage bits: LP, MP, UP, and XP.

When the first sub-mode Model21 is employed for program operation, the LP storage bit uses RAID for data recovery, and the MP, UP and XP storage bits (e.g., the first part of the data) are obtained from the cache latch (C Latch) through the memory controller 51 and the recovered data re_Data is obtained.

When the second sub-mode Model22 is employed for program operation, the LP and MP storage bit uses RAID for data recovery, and the UP and XP storage bits (e.g., the second part of the data) are obtained from the cache latch (C Latch) through the memory controller 51 and the recovered data re_Data is obtained.

Due to the large amount of data in the first part, the first sub-mode Model21 is used to obtain and recover the data re_Data from the cache latch (C Latch) through the memory controller 51, which is beneficial to improving the speed of obtaining un-stored data and reducing the overall time consumed by data recovery.

Meanwhile, for the same amount of data, after a large amount of data is obtained from the cache latch (C Latch) using the memory controller 51 and the recovered data re_Data is obtained, the remaining data is recovered using the independent redundant disk array RAID, thus, an amount of data recovery using RAID in the first sub-mode Model21 is less than an amount of data recovery using RAID in the second sub-mode Model22, thereby reducing the resources occupied by the processor (e.g., memory controller) and further reducing the time consumed by the recovery of all data in the memory cell.

In some examples, for the partial data described above corresponding to the data on which coarse program has been performed but fine program has not been performed, the original user data may be obtained by decoding the recovered data re_Data, and then the recovered data re_Data is obtained in conjunction with RAID, and then the recovered data re_Data is re-encoded.

For example, the memory controller 51 is configured to: decode the data of the storage bit corresponding to the data latch (D Latch) in which data has not been updated to acquire the user data for the storage bit corresponding to the data latch (D Latch) that has not been updated (e.g., the original data when there is no error in the program state). For example, the decoding method includes de-randomization encoding processing and/or error correction decoding processing.

The incorrect data of the storage bit corresponding to the data latch (D Latch) in which data has been updated is recovered with the user data for the storage bit corresponding to the data latch (D Latch) that has not been updated and in conjunction with the independent redundant disk array RAID, to acquire the user data for the storage bit corresponding to the data latch in which data has been updated (D Latch).

The user data for all the storage bits is encoded, and the memory device 60 is controlled to program the encoded data to a location different from a program location at which the program state being incorrect occurs.

For example, the storage bit corresponding to the data latch (D Latch) in which data has not been updated includes the data on which coarse program has been performed but fine program has not been performed. De-randomization encoding processing and error correction decoding processing are first performed on these data to acquire the user data of the corresponding storage bits (e.g., the original data when the program state is error-free). Then, the recovered data re_Data is obtained in conjunction with RAID.

The recovered data re_Data is used for re-encoding. The memory controller 51 controls the memory device 60 to program the encoded data to a location different from a program location at which the program state being incorrect occurs.

In some examples, an amount of data recovered with an independent redundant disk array RAID when the memory device 60 employs the first sub-mode Model21 of the second mode Model2 for a program operation is less than an amount of data recovered with an independent redundant disk array RAID when the memory device 60 employs the second sub-mode Model22 of the second mode Model2 for a program operation.

Considering that the storage bit corresponding to the data latch (D Latch) in which data has not been updated, that is, the data on which coarse program has been performed but fine program has not been performed needs to be decoded to obtain original user data and needs to be combined with the recovered data obtained through RAID processing, as a result, the overall time consumption is long, therefore, in the case that there is a large amount of data on which coarse program has been performed but fine program has not been performed, and a small amount of data recovered using RAID, the first sub-mode Model21 may be used for program operation, which, compared with using the second sub-mode Model22 for program operations, can further reduce the resources occupied by the processor (e.g., the memory controller) and improve the speed of data recovery.

In some examples, based on the data recovery process of the first mode Model1 and the second mode Model2, the duration corresponding to the first mode Model1 for which the cache latch (C Latch) stores buffered data is longer than the duration corresponding to the second mode Model2 for which the cache latch (C Latch) stores buffered data.

In the process of the same memory device 60 performing data recovery, for different program modes, e.g., the cache latch (C Latch) in the first mode Model1 releases data later than the cache latch (C Latch) in the second mode Model2. It is considered that the memory controller 51 can directly obtain the data in the cache latch (C Latch) of the page buffer 621 of the memory device 60, and the data in the data latch (D Latch) needs to be transmitted to the cache latch (C Latch) before the data may be acquired by the memory controller 51. Thus, compared with the case where the data stored in the cache latch (C Latch) directly obtained in the first mode Model1 is all the data to be recovered, by the way of all the data in the cache latch (C Latch) being released after recovery, in the second mode Model2, part of the data in the cache latch (C Latch) is recovered and then released, and then the data in the data latch (D Latch) is transmitted to the cache latch (C Latch), the memory controller 51 obtains part of the data in the updated cache latches (C Latch) and releases the data until all of the data in the data latches (D Latch) are stored in the buffer 52 (see FIG. 10) through the cache latch (C Latch); wherein, the second mode Model2 has gone through several cycles of data transmit and release processes, the length of duration that the cache latch (C Latch) stores cache data during each cycle is shorter than the length of duration that the cache latch (C Latch) corresponding to the first mode Model1 stores cache data.

Based on this, in order to reduce the probability of data loss, increase of the duration for the cache latch (C Latch) to store data in the first mode Model1 can reduce the probability that the data in the cache latch (C Latch) cannot be effectively utilized for data recovery due to the premature release of data from the cache latch (C Latch) when the program state verification fails.

In some examples, in the second mode Model2, even if the program state verification fails, some data still stored in other data latches (D Latch) and a cache latch (C Latch), which will not cause the loss of all un-stored data.

In addition, the memory controller 51 provided in the present application may also determine whether the program mode currently used to perform data recovery is not a more appropriate method based on detecting the length of time the cache latch (C Latch) stores cache data. For example, if the cache latch (C Latch) is used to store cache data for a long duration, the program mode may be switched, and if the cache latch (C Latch) in the switched program mode stores cache data for a longer duration than the duration for which the switched program mode may be used for data recovery processing previously.

In some examples, the memory controller 51 is further configured to send a third command. The memory device 60 is configured to receive the third command and in response to the third command, program the recovered data re_Data to a location different from a program location at which the program state being incorrect occurs.

Figure 11:
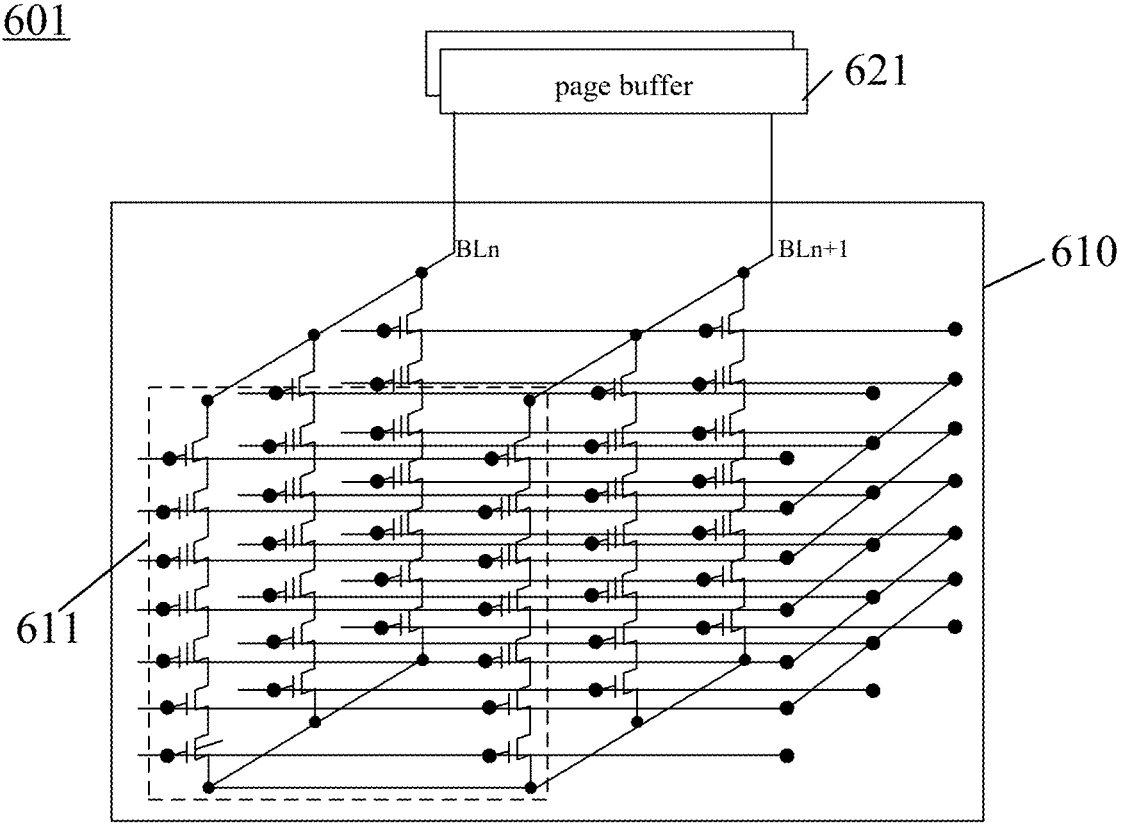
FIG. 11 is a schematic structural diagram of a memory block of a memory system provided by an example of the present application.

As an example, as shown in FIG. 11, the memory device 60 includes the memory device 60 includes at least one memory chip 601. For example, the memory chip 601 may include one or more of a Personal Computer Memory Card International Association (PC) card, a CF card, a Smart Media (SM) card, a memory stick, a Multimedia card (MMC (Multi-Media Card), RS-MMC (Reduced-Size MMC), MMCmicro), a SD card (SD, miniSD, microSD, SDHC (Secure Digital High Capacity)), UFS, etc.

The memory chip 601 includes at least one memory plane 610; the memory plane 610 includes multiple memory blocks. One memory block includes multiple memory cells, and one storage bit of one memory cell corresponds to one type of page. One data latch (D Latch) of the multiple data latches (D Latch) in the page buffer 621 is configured to cache data of a type of page of memory cells.

A program location at which the program state being incorrect occurs is a certain memory block; the memory device 60, in response to the third command, programs the recovered data re_Data to a location different from a program location at which the program state being incorrect occurs.

For example, as shown in FIG. 11, one page buffer 621 is coupled to one memory page (Page); multiple memory pages of the memory block are respectively coupled to multiple page buffers 621 (refer to page buffer bank shown in FIG. 6). Among them, data exchange may be performed between multiple page buffers 621 of one memory block. When a program location at which the program state being incorrect occurs is a certain memory page of a memory block, the memory device 60, in response to the third command, programs the recovered data re_Data into other memory pages of the memory block.

As another example, the memory controller 51 is configured to send a fourth command. The memory device 60 is configured to: receive the fourth command and in response to fourth command, program the recovered data re_Data into other memory blocks of the memory plane 610 where the program state is incorrect.

The "fourth command" and the "third command" described above are both commands indicating that the program location of the recovered data re_Data is different from a program location at which the program state being incorrect occurs. However, a "third command" may be set to have command information of an initial default storage location, e.g., the "third command" may be to program the recovered data re_Data to a different memory page in the same memory block as a program location at which the program state being incorrect occurs based on the basic logic principle of data of memory block passing through the page buffer 621; if the initial default storage location is changed, instruction information of a "fourth command" may be set, e.g., the "fourth command" may be to program the recovered data from error into other memory blocks on the memory plane in which the error occurs in the program state based on the coupling connection of the page buffers 621 coupled with different memory blocks.

Based on a program location at which the error occurs in the program state being a certain memory block; the data in one memory block may be stored as multiple memory pages using multiple page buffers 621. Moreover, the page buffers coupled to different memory blocks are coupling connected. For example, if the program state being incorrect occurs of one of the two memory blocks, and at least one page buffer of the two memory blocks is coupling connected, after the data in the memory block with an error in program state is recovered, it may be stored into another memory block with the coupled page buffer 621.

Thus, the probability that the re-obtained recovered data re_Data cannot be read or erased by subsequent program operations due to damage to the memory block may be reduced, and the effective utilization rate of the obtained recovered data re_Data may be improved.

In some examples, the memory controller 51 is configured to control the memory device 60 to re-perform the program operation with the recovered data re_Data. The logical-physical mapping table is updated after the reprogram operation is completed.

For example, the data obtained by the reprogram operation using the recovered data re_Data is stored in the logical physical mapping table (e.g., stored in the buffer 52), and correct data with good storage properties is obtained, even if this a part of the recovered data re_Data is subsequently released or lost, the memory system 50 may still utilize the data within the logical-physical mapping table to perform other program operations.

In other examples, as shown in FIGS. 12 to 24, the present application also provides a method for operating the memory system 50. The operation method includes: S100~S300.

The memory system 50 includes memory device 60 and memory controller 51. The memory device 60 includes a memory cell storing multiple bits, and a page buffer 510 located in a peripheral circuit. A page buffer 510 may include one or more data latches (D Latch), cache latch (C Latch), sense latch (S Latch), and low voltage latch (LVT Latch). Among them, multiple data latches (D Latch) are configured to respectively cache one bit of data to be written into the memory cell; the cache latch (C Latch) is configured to first transmit external data to the cache latch (C Latch), and then transmit it to the data latch (D Latch) through the cache latch (C Latch), and transmit the data in the data latch (D Latch) to the cache latch (C Latch), and then transmit it to the outside through the cache latch (C Latch).

Figure 12:
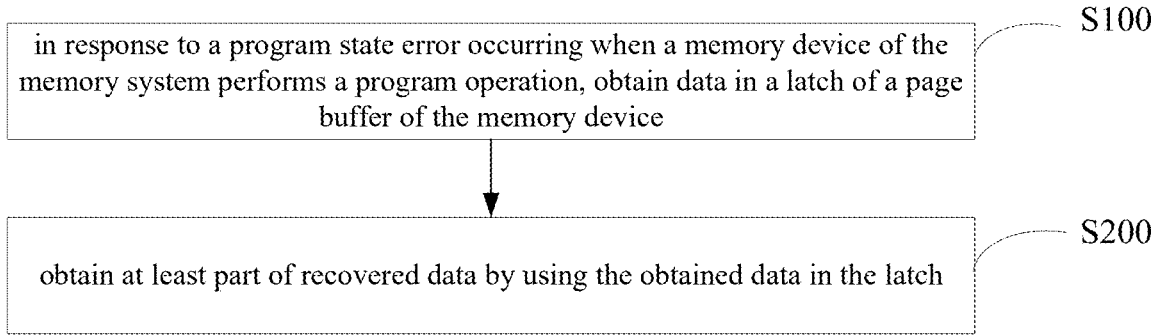
FIG. 12 is a schematic flowchart 1 of a method for operating a memory system provided by an example of the present application.

S100: as shown in FIG. 12, in response to a program state being incorrect occurring when a memory device 60 of the memory system 50 performs a program operation, obtain data in a latch of a page buffer 621 of the memory device 60.

As an example, the memory device 60 includes a memory cell that stores multiple bits; the latch includes one or more data latches (D Latch) and a cache latch (C Latch), wherein one data latch (D Latch) is configured to respectively buffer one bit of data to be written to the memory cell; the cache latch (C Latch) is configured to buffer data for interaction between the memory device 60 and the memory controller 51.

Figure 14:
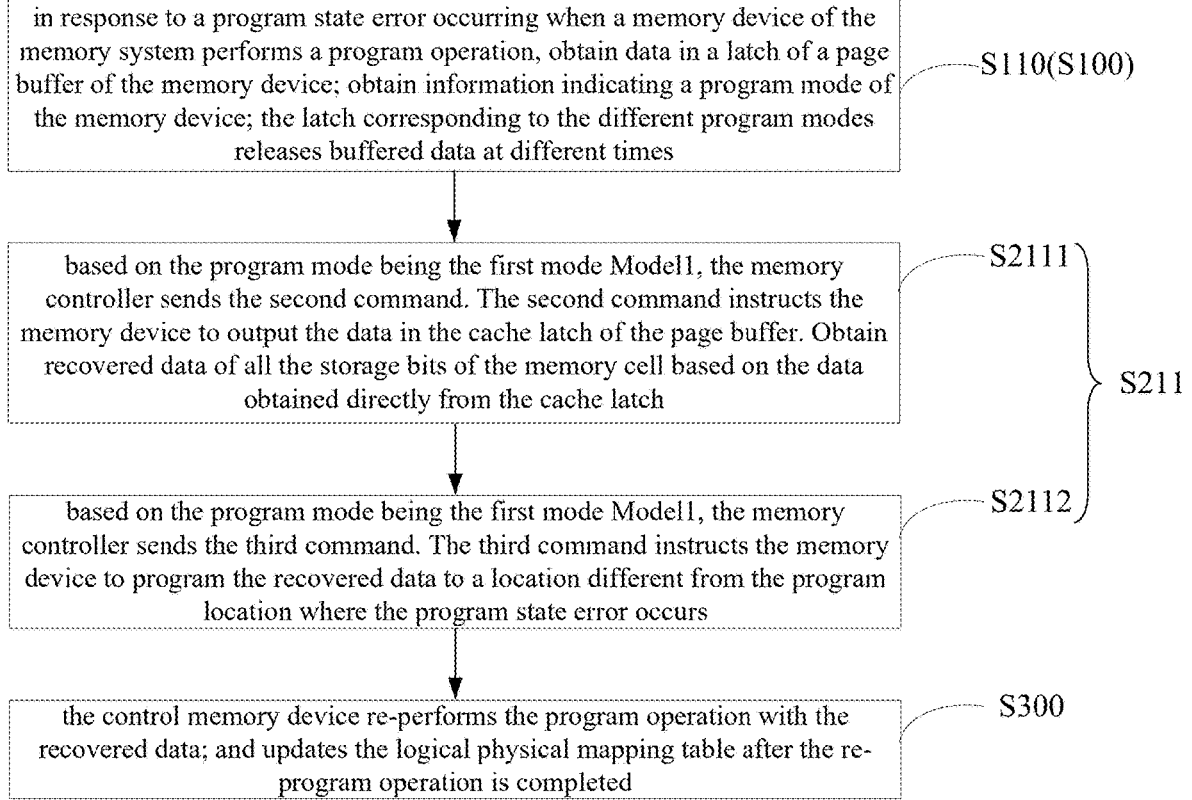
FIG. 14 is a schematic flowchart 1 of a method for operating a memory system provided by an example of the present application.

As shown in FIG. 14, S100 includes S110: before obtaining the data in the latch (C Latch), obtain information for representing a program mode of the memory device 60; the latches corresponding to the different program modes release buffered data at different times.

In the case of the program state error described above, the data in the buffer 52 (see FIG. 10) is lost or not successfully stored, and therefore, it is required to obtain data that has not been successfully stored from the latch 6210 and re-store it into the buffer 52. The "program mode" is determined based on different processes that can obtain data that is not stored in the buffer 52 from different latches of the memory device 60, e.g., the process in which all data not stored in the buffer 52 may be obtained from the cache latch (C Latch) corresponds to one program mode. The process in which data not successfully stored in the buffer 52 may be obtained from the cache latch (C Latch) and the data latch (D Latch) corresponds to another program mode. Since the un-stored data is in different latches 6210, different operations need to be performed to obtain the data in all latches 6210 in different program modes. Thus, for different location state of the data that is currently not stored (e.g., the data to be recovered), different operations of the memory controller 51 performing data recovery in response to different program modes are determined.

For example, all the data to be recovered has been cached in the cache latch (C Latch), and the memory controller 51 responds to the command of the first mode Mode1; or part of the data to be stored has been stored in the data memory D Latch, the other part is cached into the cache latch (C Latch), and the memory controller 51 responds to the command of the second mode Model2. Different program modes generate different commands, and the memory controller 51 performs corresponding operations in response to the different commands. That is to say, in the case that a program state is incorrect when the memory device 60 performs a program operation, the requirement for the memory controller 51 responding to the command of the first mode Model1 is that the data in the cache latch (C Latch) may be released only after all memory cells in the memory cell array complete the program operation (and pass the program state verification), and data of the next storage bit is stored. While the requirement for the memory controller 51 responding to the command of the second mode Model2 is that the data in the cache latch (C Latch) may be released when part of the program states of memory cell pass the verification, and it is not required for all the memory cells in the memory cell array complete the program operation (and pass the program state verification), and data of the next storage bit is stored. Thus, determining different operating modes through different program modes and selecting a more appropriate data recovery method may improve the speed of data recovery and reduce the time consumed by data recovery.

Figure 7B:
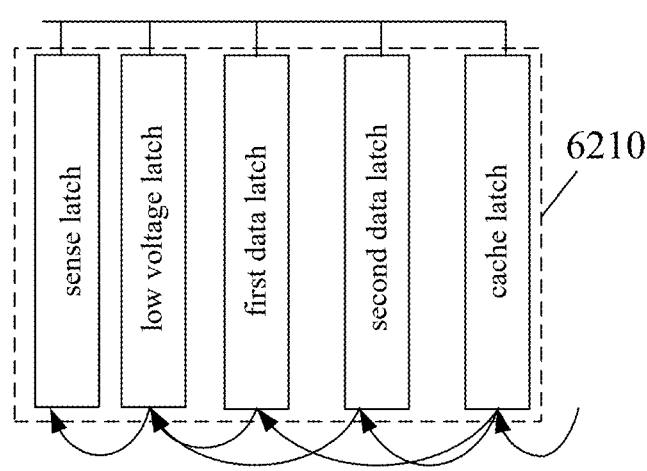
FIG. 7B is another schematic structural diagram of multiple latches of the page buffer provided by an example of the present application.

In some examples, as shown in FIG. 7B, the storage type of the memory cell is TLC and may include 5 latches 6210. The five latches 6210 include a sense latch (S Latch), a low voltage latch (LVT Latch), a first data latch (D Latch1), a second data latch (D Latch2), and a cache latch (C Latch). Moreover, the storage mode of the memory cell is TLC, including 3 storage bit data of LP, MP and UP, and as shown in FIG. 13, there are 8 storage states (threshold voltage distribution states) L0~L7.

Figure 15:
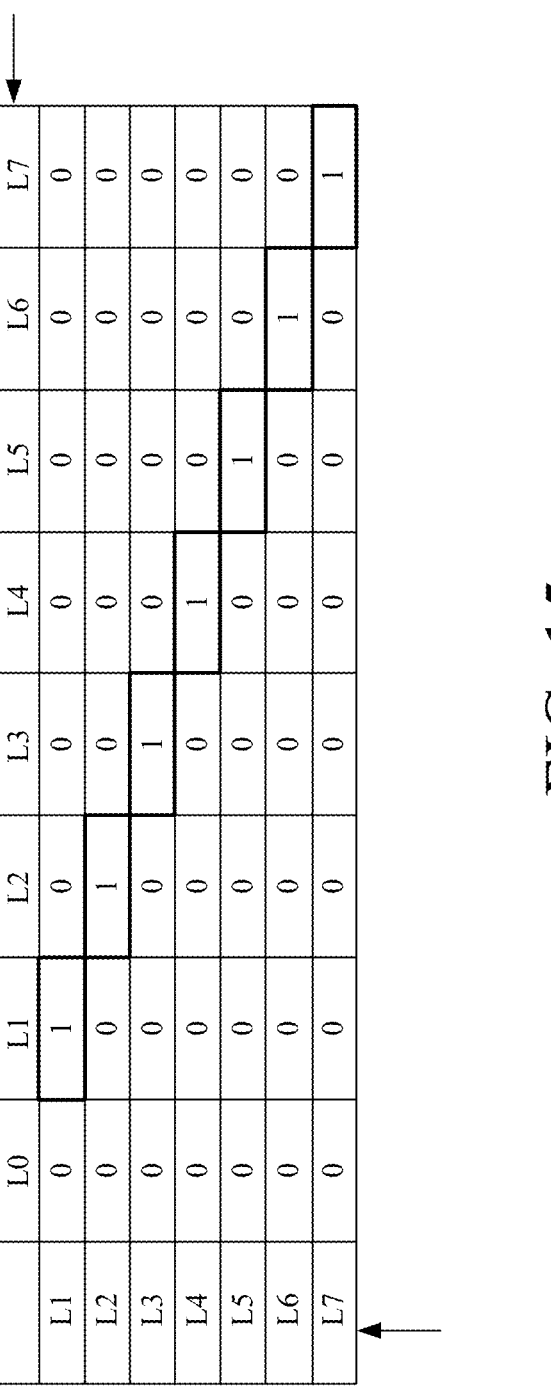
FIG. 15 is a schematic diagram of a verification process of a sense latch for the memory cell shown in FIG. 13.

Based on this, the first row of the table shown in FIG. 15 represents the eight threshold voltage distribution states of the memory cell TLC, and the first column on the left represents the seven program states of L1 to L7 that need to be verified (L0 is an erase state and does not need to be verified and recovered). During the program verification process, data pre-processing (DPP) is first performed on the data in the latches to determine the data latched in the multiple latches corresponding to L0~L7 and can be used for verification. Then multiple data transmitted by the sense latch (S Latch) are obtained and verified in sequence (e.g., it is verified whether the threshold voltage distribution state of L0~L7 shown in the first row of the table shown in FIG. 15 is within the threshold voltage distribution range of the program state of L1~L7 shown in the leftmost column, if the verification passes, the verification code is 1).

Specifically, since the cache latch (C Latch) is used to temporarily store data for the memory device 60 to interact with the outside world, and the data latch (D Latch) is used to latch the data of the designated page of the memory cell, therefore, in order to release the cache latch (C Latch) as early as possible, the method that requires the data in the cache latch (C Latch) to participate in the verification is not adopted, instead, data may be set to be stored in multiple data latches (D Latch) according to the storage mode of the memory cell, and verification may be implemented only according to the data in multiple data latches (D Latch). As shown in FIG. 13, in the case that the 8 storage states of the TLC memory cell correspond to the storage bits in different latches, considering the process of storing the 8 storage states in different latches, the case that the data state of the cache latch (C Latch) storing the UP bit is "0" may be set in the last four storage states of the eight storage state verification sequences, thus, in the case where the data in the cache latch (C Latch) is not used to participate in the verification, the earliest time to release the data in the cache latch (C Latch) may be after the L4 verification of the storage state L1~L7 is passed. Thus, during the process of verifying the L5, L6 and L7 storage states in sequence, the cache latch (C Latch) may be set to release the data after the verification of any of the three storage states is successful.

Fore example, the subsequent example shows that the process of releasing the data of the cache latch (C Latch) after successful L4 verification belongs to the second mode Model2. For example, the process of releasing the data of the cache latch (C Latch) after successful L4 verification belongs to the first sub-mode Model21 in the second mode Model2; and the process of releasing the data of the cache latch (C Latch) after successful L5 or L6 verification belongs to the second sub-mode Model22.

As another example, sequential verification of the seven storage states of L1 to L7 are successfully means that the cache latch (C Latch) contains all of the un-stored data, and it is required to transmit all the data in the cache latch (C Latch) to the sense latch (S Latch) through the data latch (D Latch) and release the data in the cache latch (C Latch) after successful verification, e.g., the process of releasing the data of the cache latch (C Latch) after the successful L7 verification belongs to the first mode Model1.

In some examples, in response to a program state being incorrect occurring when a memory device 60 of the memory system 50 performs a program operation, the program mode information is obtained, and the data in the cache latch (C Latch) is obtained. The cache latch (C Latch) corresponding to different program modes releases buffered data at different times.

Based on this, a duration corresponding to the first mode Model1 for which the cache latch (C Latch) stores buffered data is longer than the duration corresponding to the second mode Model2 for which the cache latch (C Latch) stores buffered data. That is, for the same usage state of the same memory device 60, the time at which the cache latch (C Latch) releases the buffered data corresponding to the first mode Model1 is later than the time at which the cache latch (C Latch) releases the buffered data corresponding to the second mode Model2.

For the same usage state of the same memory device 60, it is considered that in the first mode Model1, the data stored in the cache latch (C Latch) is all of the un-stored data; while in the second mode Model2, the un-stored data is stored in the data latch (D Latch) and cache latch (C Latch) respectively, based on this, in order to reduce the probability of data loss, increase of the duration for the cache latch (C Latch) to store data in the first mode Model1 can reduce the probability that the data in the cache latch (C Latch) cannot be effectively utilized for data recovery due to the premature release of data from the cache latch (C Latch) when the program state verification fails.

In some examples, in the second mode Model2, even if the program state verification fails, some data still stored in other data latches (D Latch) and a cache latch (C Latch), which will not cause the loss of all un-stored data.

S200: as shown in FIG. 12, acquire at least a part of recovered data re_Data with the obtained data in the latch. For example, at least part of recovered data re_Data is obtained with the obtained data in the cache latch (C Latch).

In some examples, S200 includes S210: according to the program mode, determine whether to control the memory device 60 to transmit the data in the data latch (D Latch) to the cache latch (C Latch), and the data transmitted to the cache latch (C Latch) is obtained. Wherein, before the data in the data latch (D Latch) is transmitted to the cache latch, a part of the recovered data re_Data is acquired with the buffered data.

In some examples, during the program process, the data of one storage bit may be stored in the cache latch (C Latch), and before the data of the next storage bit is stored in the cache latch (C Latch), first, the data stored in the cache latch (C Latch) is transmitted to the data latch (D Latch), and then the data of the next storage bit is stored into the cache latch (C Latch). This process is repeated until all data memories (D Latch) in the page buffer 621 store data or the storage of data to be stored is completed. For example, as shown in FIG. 7B, the storage type of the memory cell is TLC and may include 5 latches 6210. The five latches 6210 include a sense latch (S Latch), a low voltage latch (LVT Latch), a first data latch (D Latch1), a second data latch (D Latch2), and a cache latch (C Latch). Moreover, the storage type of the memory cell includes TLC, including 3 storage bit data of LP, MP and UP. LP data is transmitted to the cache latch (C Latch). Before the MP data is transmitted to the cache latch (C Latch), the LP data in the cache latch (C Latch) is first transmitted to the second data latch (D Latch2), and then the MP data is stored into the cache latch (C Latch). Before the UP data is transmitted to the cache latch (C Latch), the MP data in the cache latch (C Latch) is first transmitted to the first data latch (D Latch1), and then the UP data is stored into the cache latch (C Latch). Based on this, in the process of data recovery using the data in the latch (Latch), it is determined according to the program mode whether it is required to obtain only data in the cache latch (C Latch) directly, or to obtain data in both the data latch (D Latch) and the cache latch (C Latch). Thus, the data transmission process of different latches (Latch) is controlled in response to commands in different program modes. The following examples illustrate the data transmission process in different program modes.

According to different program modes, S210 includes: S211 based on the program mode being the first mode Model1 (see FIG. 14), and S212 based on the program mode being the second mode Model2 (see FIG. 21).

S211: based on the program mode being a first mode Model1, directly obtain the data in the cache latch (C Latch) of page buffer 621 and acquire at least a part of the recovered data re_Data.

The program mode is the first mode Model1, and there is data in the cache latch (C Latch), this part of data may be all of the storage bit data of the memory cells that are not stored when the program state being incorrect occurs, or may be part of the storage bit data of the memory cells that are not stored when the program state being incorrect occurs. Based on the functional attributes of the cache latch (C Latch), the data in the cache latch (C Latch) may be directly obtained through the memory controller 51 to obtain at least a part of the recovered data re_Data.

For example, as shown in FIG. 14, S211 includes S2111 and S2112.

S2111: based on the program mode being the first mode Model1, the memory controller 51 sends the second command. The second command instructs the memory device 60 to output the data in the cache latch (C Latch) of the page buffer 621.

For example, as shown in FIG. 7B and FIGS. 15 to 18, the first row of the table shown in FIG. 15 shows the threshold voltage distribution state of L0~L7, the L1~L7 shown in the leftmost column are the threshold voltage distribution states of the program state that need to be verified (L0 is the erased state and does not need to be verified and recovered).

As shown in FIG. 16, during the verification process of L0~L4, the verification codes of L0~L4 are all 1 (at this point, the data type in the sense latch may be abbreviated as DS), e.g., the verification is passed and the data of L0~L4 has been stored into the buffer 52, and then the data of LP (the data type in the cache latch (C Latch) may be abbreviated as DC) is stored into the cache latch (C Latch).

As shown in FIG. 17, during the verification process of L5, a verification code of 1 for L5 is obtained, that is, the verification is passed, and the data of LP in the cache latch (C Latch) is transmitted to the first data latch (D Latch1) (the data type in the first data latch (D Latch1) may be abbreviated as D1), then the LP data is released and the data of MP is stored until the current L5 verification operation ends.

As shown in FIG. 18, during the verification process of L6, a verification code of 1 for L6 is obtained, that is, the verification is passed, and the data of MP in the cache latch (C Latch) is transmitted to the second data latch (D Latch2) (the data type in the first data latch (D Latch1) may be abbreviated as D1), then the MP data is released and the UP data of the next memory cell is stored until the current L6 verification operation ends.

By analogy, during the verification process of L7, the UP data in the cache latch (C Latch) may be transmitted to the first data latch (D Latch1) or the second data latch (D Latch2), and the threshold voltage distribution of L7 is verified to obtain a verification code of 1 or 0, and in the case that the verification code is 1, the verification is passed, then the MP data in the cache latch (C Latch) is released and the LP data of the next memory cell is stored.

Based on this, if the program state verified when a program state being incorrect occurs in different memory cells is different, the data stored in the corresponding cache latch (C Latch) may be different, e.g., the data stored in the cache latch (C Latch) may include any storage bit data of LP, UP and MP. Subsequent operations may utilize multiple data stored in multiple cache latches (C Latch) to obtain at least a part of the recovered data re_Data.

In some examples, recovered data of all the storage bits of the memory cell is obtained based on the data obtained directly from the cache latch (C Latch).

For example, the data in multiple cache latches (C Latch) is all of the storage bit data of the memory cells that are not stored when the program state being incorrect occurs, the data obtained directly from the cache latch (C Latch), the recovered data that can obtain all the storage bits of the memory cell. For example, the storage type of the memory cell includes QLC, including 4 storage bits: LP, MP, UP, and XP. Wherein, it takes 77 microseconds to transmit the data in a data latch (D Latch) to the cache latch (C Latch), and it takes 308 microseconds to recover the data of 4 storage bits using the first sub-mode Model21.

S2112: based on the program mode being the first mode Model1, the memory controller 51 sends the third command. The third command instructs the memory device 60 to program the recovered data re_Data to a location different from a program location at which the program state being incorrect occurs.

As an example, when the memory device 60 employs the first mode Model1 to perform a program operation, after all program states pass verification, the cache latch (C Latch) releases the buffered data corresponding to the program operation. Wherein, as shown in FIGS. 7A and 7B, the data of the cache latch (C Latch) is transmitted to the sense latch (S Latch) through the data latch (D Latch) for program state verification, and after passing the verification, the data in the sense latch (S Latch) is output through the cache latch (C Latch). For example, the program state of the data in multiple data latches (D Latch) may be verified in sequence, and after the verification is passed, the cache latch (C Latch) releases the buffered data and stores data corresponding to a next program operation, and then transmits the data to part of the data latch (D Latch). Moreover, the data that passes the verification may be transmitted to the buffer 52.

If the program state of the data in a certain data latch (D Latch) does not pass the verification, the unreleased data in the cache latch (C Latch) is retransmitted to the data latch (D Latch), and then verification is performed again.

In some examples, as shown in FIG. 11, the memory device 60 includes the memory device 60 includes at least one memory chip 601. The memory chip 601 includes at least one memory plane 610; the memory plane 610 includes multiple memory blocks. One memory block includes multiple memory cells, and one storage bit of one memory cell corresponds to one type of page. One data latch (D Latch) of the multiple data latches (D Latch) in the page buffer 621 is configured to cache data of a type of page of memory cells.

Figure 19:
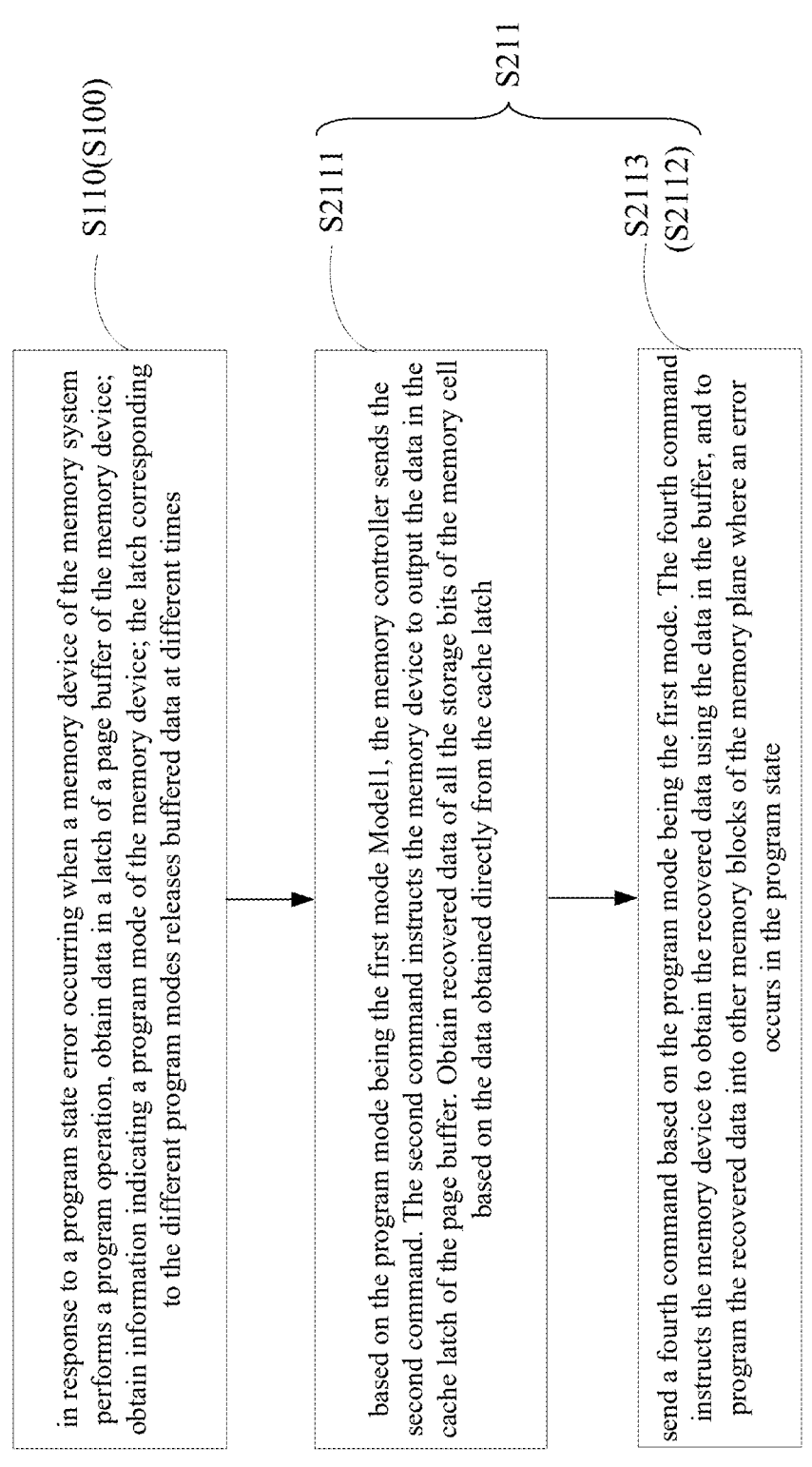
FIG. 19 is a schematic flowchart 2 of a method for operating a memory system provided by an example of the present application.

As shown in FIG. 19, S2112 includes S2113: send a fourth command based on the program mode being the first mode Model1. The fourth command instructs the memory device to acquire the recovered data re_Data with the data in the buffer, and to program the recovered data re_Data into other memory blocks of the memory plane 610 where the program state being incorrect occurs.

Figure 20A:
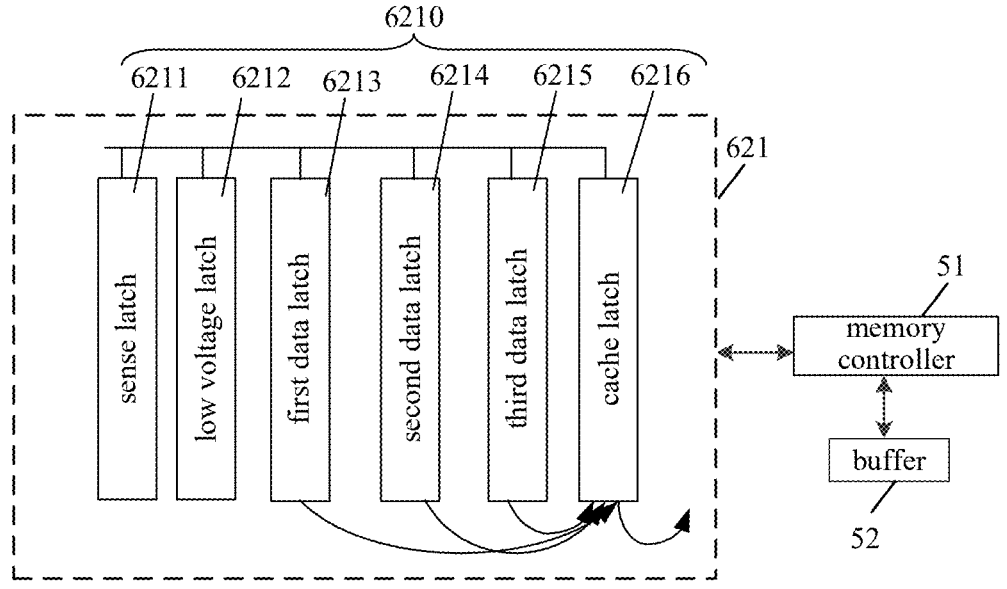
FIG. 20A is a schematic flow chart of a latch in the method for operating the memory system provided by an example of the present application.

As an example, the data recovery process based on the first mode Model1, and the storage type of the memory cell includes QLC, including 4 storage bits: LP, MP, UP, and XP. The page buffer 621 includes three data latches (D Latch) and a cache latch (C Latch). As shown in FIG. 20A, the data of storage bit MP stored in the first data latch 6213 of the sense latch (S Latch), the data of storage bit UP stored in the second data latch 6214, and the data of storage bit XP stored in the third data latch 6215 are transmitted to the cache latch 6216 successively. The memory controller 51 obtains the data in the cache latch (C Latch) and obtains the corresponding recovered data re_Data. Then, the memory controller 51 programs the recovered data re_Data into other memory blocks in the memory plane 610 where the program state is incorrect. For example, one memory plane 610 includes multiple memory blocks, and one page buffer 621 of multiple page buffers 621 (or page buffer banks) coupled to one memory block may perform data interaction with one page buffer 621 of multiple page buffers 621 coupled to another memory block. Thus, the recovered data re_Data corresponding to a program state error in one memory block may be programmed into another memory block, which can reduce the probability that the recovered data re_Data stored in other memory pages of this memory block cannot be effectively used due to damage to the memory block.

S212: as shown in FIG. 21, based on the program mode being the second mode Model2, the memory device 60 is controlled to transmit data in multiple data latches (D Latch) to the cache latch (C Latch) respectively, and obtain the data transmitted from data latches (D Latch) to the cache latch (C Latch), and acquire a part of the recovered data re_Data; and before the data in the data latch D Latch is transmitted to the cache latch, acquire a part of the recovered data re_Data with the buffered data in the cache latch (C Latch).

For example, the storage type of the memory cell includes TLC, the program cycle time required to complete the program of 3-bit storage bit data (requires 18 program cycle operations) is 400*3=1200 microseconds, and the duration of one program cycle operation (one bit of data may be written) is approximately 67 microseconds. The time it takes to transmit 18 KB data at a rate of 2400 Gb/s is approximately 62 microseconds, that is, during the data recovery process, the time it takes to transmit one bit of data to the cache latch (C Latch) is approximately 62 microseconds. Thus, the duration of transmitting one bit of data is less than or equal to the duration of programming at least one remaining bit of data, therefore it is possible to recover data by obtaining the data of the cache latch (C Latch) while programming one bit of data without adding extra time, thereby reducing the time consumed by data recovery.

Continuing to refer to FIG. 21, S212 includes S2121, S2122, S2123 and S2124.

Figure 20B:
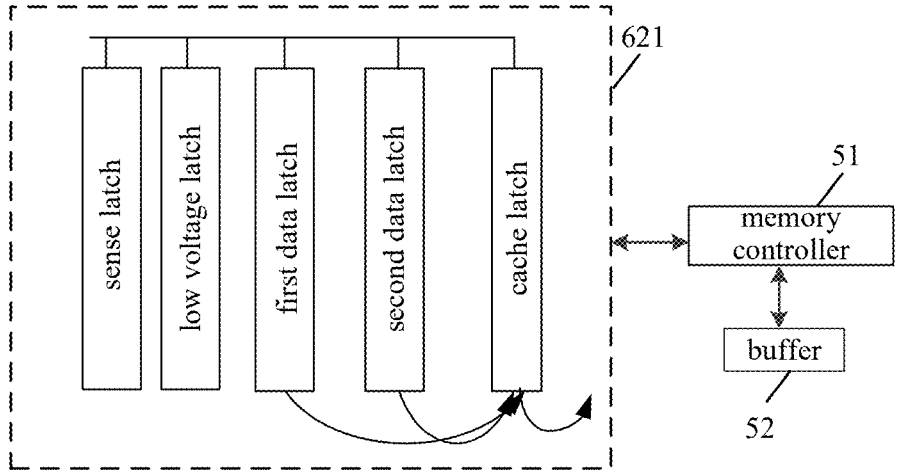
FIG. 20B is a schematic flow chart of another latch in the method for operating the memory system provided by an example of the present application.

S2121: memory controller 51 includes the buffer 52 (see FIGS. 20A and 20B). Based on the program mode being the second mode Model2, the memory controller 51 is configured to send the second command. The memory device 60 is configured to receive the second command and in response to the second command, send the data in the cache latch (C Latch) to the buffer 52.

In some examples, the "second command" is used to send the data in the cache latch (C Latch) to the buffer 52. The "second command" may be an instruction that applies various program modes without being limited to the type of each program mode, or may be different instructions in different program modes but have the same function. This is not limited in examples provided in the present application and may be set according to actual demands.

S2122: based on the program mode being the second mode Model2, send a first command; the first command instructs the memory device 60 to transmit data in multiple data latches (D Latch) to the cache latch (C Latch) respectively. Wherein the first command is configured by a setting feature command.

For example, the setting feature command may include arbitration, power management, logical address range type, temperature threshold, error recovery, volatile write notification cache, interrupt engagement, interrupt appropriate configuration, write atomic normal, asynchronous event configuration, automatic power state transition, host memory buffer, command set specific, wall clock time or timestamp corresponding to absolute time, supported protocol versions, etc. In some examples provided the present application, a first command is sent by the memory controller 51 for "error recovery" based on a setting feature command.

In some examples, based on the program mode being the second mode Model2, before the data in the data latch D Latch is transmitted to the cache latch, a part of the recovered data re_Data is acquired with the buffered data in the cache latch (C Latch). Thus, the data currently stored in the cache latch (C Latch) of multiple memory cells may first be sent to the buffer 52 in response to the "second command", then in response to the "first command", the data in the multiple data latches (D Latch) of multiple memory cells are transmitted to the cache latch (C Latch) in sequence respectively, then data exchange with external electronic components through the cache latch (C Latch) is implemented.

S2123: based on the program mode being the second mode Model2, after S2122, the memory controller 51 is configured to send the second command again. The memory device 60 is configured to receive the second command and in response to the second command, send the data in the cache latch (C Latch) to the buffer 52.

For example, as shown in FIGS. 16-18 and FIG. 21B, the storage type of the memory cell includes TLC, including 3 storage bit data of LP, MP and UP, and 8 storage states L0~L7.

For example, for the program operation and program verification process of the same memory cell, after the L4 verification is successful, the memory device 60, in response to the second command, releases the data in the cache latch (C Latch) to the buffer 52 and stores the LP data of the next memory cell. Then, during the L5 verification process, after the data in the cache latch (C Latch) is stored into the sense latch for verification and after the L5 verification is passed (verification code is 1), the LP data in the cache latch (C Latch) is sent to the buffer 52 and the MP data of the next memory cell is stored. Then, during the L6 verification process, after the data in the cache latch (C Latch) is stored into the sense latch for verification and the L6 verification is successful, the MP data in the cache latch (C Latch) is sent to the buffer 52 and the UP data of the next memory cell is stored. Similarly, the data in the cache latch (C Latch) of multiple memory cells is sent to the buffer 52.

S2124: based on the program mode being the second mode Model2, send a third second command. The third command instructs the memory device 60 to program the recovered data re_Data to a location different from a program location at which the program state being incorrect occurs.

In some examples, memory controller 51 encodes the user data for all the storage bits, and controls the memory device 60 to program the encoded data to a location different from a program location at which the program state being incorrect occurs.

As an example, the memory device 60 includes the memory device 60 includes at least one memory chip 601. The memory chip 601 includes at least one memory plane 610; the memory plane 610 includes multiple memory blocks. One memory block includes multiple memory cells, and one storage bit of one memory cell corresponds to one type of page. One data latch (D Latch) of the multiple data latches (D Latch) in the page buffer 621 is configured to cache data of a type of page of memory cells.

For example, a program location at which the program state being incorrect occurs is a certain memory block; the memory device 60, in response to the third command, programs the recovered data re_Data into a different memory page in the same memory block as a program location at which the program state being incorrect occurs.

Figure 22:
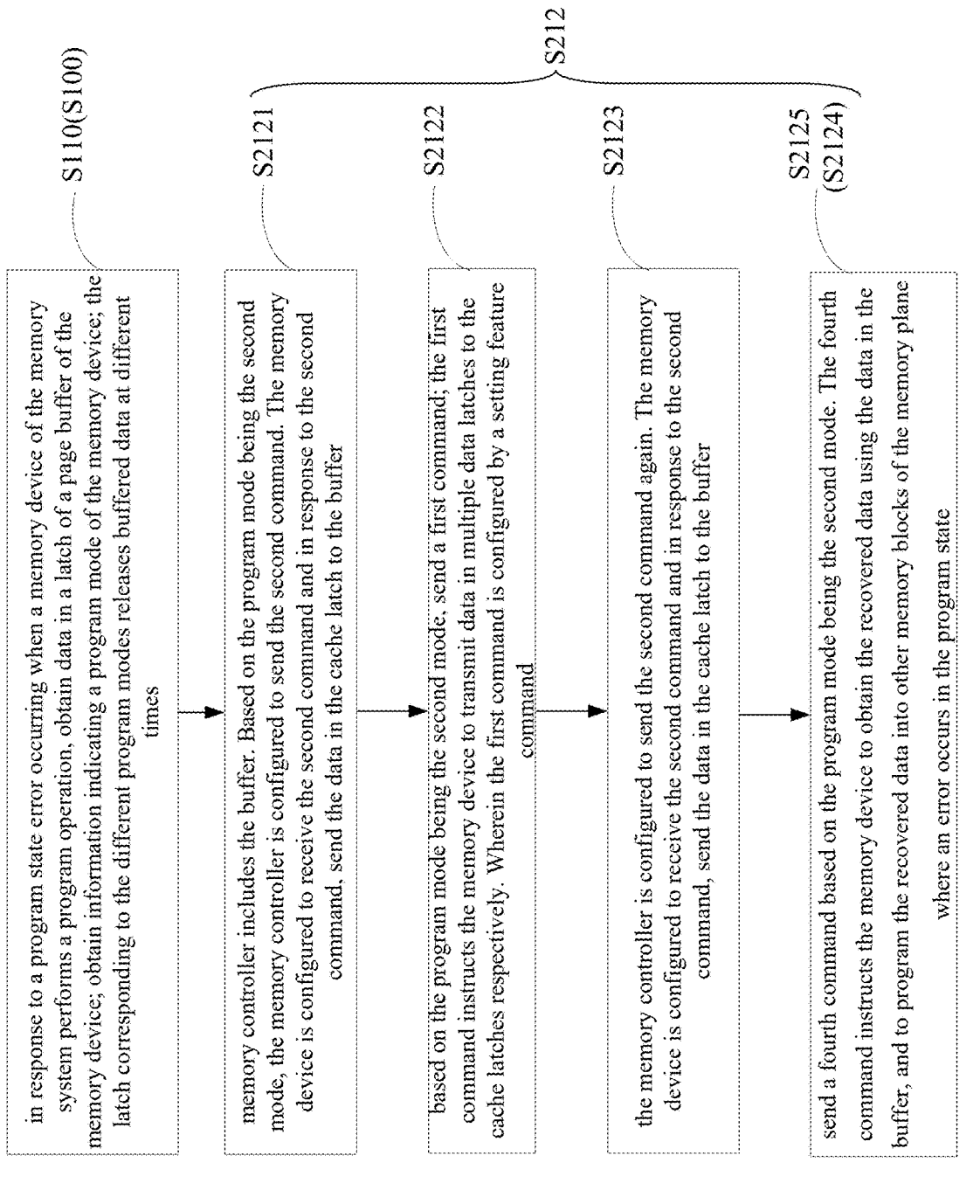
FIG. 22 is another schematic flowchart 2 of a method for operating a memory system provided by an example of the present application.

As another example, as shown in FIG. 22, S2124 includes S2125: send a fourth command based on the program mode being the second mode Model1. The fourth command instructs the memory device 60 to acquire the recovered data re_Data with the data in the buffer 52, and to program the recovered data re_Data into other memory blocks of the memory plane in which the program state being incorrect occurs.

In some examples, the "fourth command" and the "third command" described above are both commands indicating that the program location of the recovered data re_Data is different from a program location at which the program state being incorrect occurs. However, a "third command" may be set to have command information of an initial default storage location, e.g., the "third command" may be to program the recovered data re_Data to a different memory page in the same memory block as a program location at which the program state being incorrect occurs based on the basic logic principle of data of memory block passing through the page buffer 621; if the initial default storage location is changed, instruction information of a "fourth command" may be set, e.g., the "fourth command" may be to program the recovered data from error into other memory blocks on the memory plane in which the error occurs in the program state based on the coupling connection of the page buffers 621 coupled with different memory blocks.

The first command, second command, third command and fourth command described above respectively control the memory device 60 to transmit the data storage location. The following example illustrates the recovery method of data in different storage states with the data in the data latch (D Latch) in the second mode Model2. For example, considering that the data located in the data latch (D Latch) may reflect different storage states of the memory cell, the data in these different storage states may be recovered in different ways.

Figure 23:
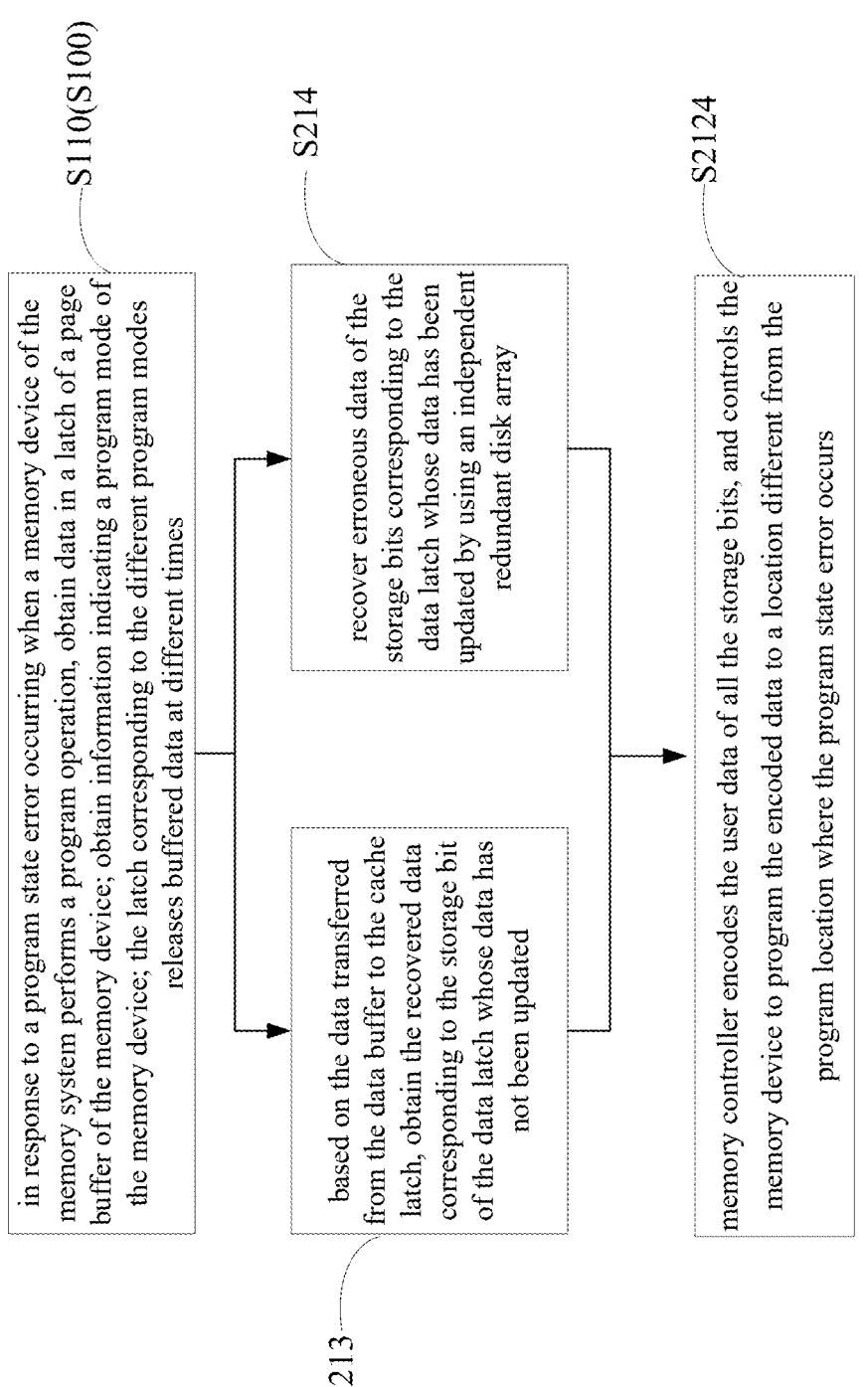
FIG. 23 is another schematic flowchart 3 of a method for operating a memory system provided by an example of the present application.

As shown in FIG. 23, S212 further includes S213 and S214.

S213: based on the data transmitted from the data latch (D Latch) to the cache latch (C Latch), acquire the recovered data re_Data corresponding to the storage bit of the data latch (D Latch) in which data has not been updated.

S214: recover incorrect data of the storage bit corresponding to the data latch (D Latch) in which data has been updated with an independent redundant disk array RAID.

For example, the program operation performed by the memory device 60 includes a multi-pass program operation on a set of the memory cells, e.g., a coarse program operation is followed by a fine program operation. For example, when a program state being incorrect occurs during the program operation of a group of memory cells of the memory device 60, data of the data latch (D Latch) of some storage bits includes the data on which coarse program has been performed but fine program has not been performed (e.g., the data of the data latch (D Latch) that has not been updated), these data can be directly transmitted from the data latch (D Latch) to the cache latch (C Latch); and the memory controller 51 obtains the data in the cache latch (C Latch) and obtains the recovered data re_Data corresponding to the storage bit. The data in the data latch (D Latch) of another part of the storage bits includes the data on which fine program has been performed (e.g., the data of the data latch (D Latch) that has been updated), these data may be recovered directly through RAID to acquire the recovered data re_Data corresponding to the storage bit. Thus, by combining these two data recovery methods, when there is a large amount of lost data, compared with data recovery only through RAID, the resource usage of the processor (e.g., a memory controller) is reduced and the time consumed by data recovery is in turn decreased.

As another example, if all of the data in the data latch (D Latch) are data on which fine program operation has been performed, these data can also be directly transmitted from the data latch (D Latch) to the cache latch (C Latch); and the memory controller 51 obtains the data in the cache latch (C Latch) and obtains the recovered data re_Data corresponding to the storage bit.

Thus, RAID may not be used for data recovery, thereby reducing the resource usage of the processor (e.g., memory controller) and usage of other storage space, and compared with data recovery through RAID, the method in this example improves the speed of data recovery and reduces the time consumed by data recovery.

Based on this, in some examples, for the finely programmed data in the above second mode Model2, a sub-mode may be selected based on an amount of data in this part, moreover, the cache latch (C Latch) in different sub-modes releases the buffered data corresponding to the program operation at different times, e.g., different sub-modes are selected according to an amount of data that the cache latch (C Latch) can store, which can reduce the probability of data loss due to the cache latch (C Latch) releasing data faster than the rate of storing data, thereby improving the accuracy and integrity of data recovery.

For example, the second mode Mode2 includes the first sub-mode Mode21 and the second sub-mode Mode22. As shown in FIG. 24, S212 includes S215 and S216.

S215: When the memory device 60 employs the first sub-mode Mode21 to perform a program operation, after the verification of a first part of the program states passes, the cache latch (C Latch) releases the buffered data corresponding to the program operation, and updates data corresponding to a next program operation into a part of the data latches (D Latch).

For example, after all program states in the data latch (D Latch) pass verification, the cache latch (C Latch) releases the buffered data corresponding to the program operation. Among them, the data of the cache latch (C Latch) is transmitted to the sense latch (S Latch) through the data latch (D Latch) for program state verification. For example, the program state of the data in multiple data latches (D Latch) may be verified in sequence, and after the verification is passed, the cache latch (C Latch) releases the buffered data and stores data corresponding to a next program operation (e.g., a fine program operation or an operation to store the storage bit of the next memory cell), and then transmits the data to part of the data latch (D Latch).

If the program state of the data in a certain data latch (D Latch) does not pass the verification, the unreleased data in the cache latch (C Latch) is retransmitted to the data latch (D Latch), and then verification is performed again.

For example, as shown in FIG. 7B and FIGS. 16 to 18, among the processes of verifying L0~L4, during the verification process of the data in the storage state of L0~L4, a verification code of 1 is obtained, e.g., the verification is passed, and the data of L0~L4 is stored in the buffer. Then, the data of LP is stored into the cache latch (C Latch).

As shown in FIG. 16, during the verification process of L0~L4, the verification codes of L0~L4 are all 1 (at this point, the data type in the sense latch may be abbreviated as DS), e.g., the verification is passed and the data of L0~L4 has been stored into the buffer 52, and then the data of LP (the data type in the cache latch (C Latch) may be abbreviated as DC) is stored into the cache latch (C Latch).

As shown in FIG. 17, during the verification process of L5, a verification code of 1 for L5 is obtained, that is, the verification is passed, and the data of LP in the cache latch (C Latch) is transmitted to the first data latch (D Latch1) (the data type in the first data latch (D Latch1) may be abbreviated as D1), then the LP data is released and the data of MP is stored until the current L5 verification operation ends.

As shown in FIG. 18, during the verification process of L6, a verification code of 1 for L6 is obtained, that is, the verification is passed, and the data of MP in the cache latch (C Latch) is transmitted to the second data latch (D Latch2) (the data type in the first data latch (D Latch1) may be abbreviated as D1), then the MP data is released and the UP data of the next memory cell is stored until the current L6 verification operation ends.

By analogy, during the verification process of L7, the UP data in the cache latch (C Latch) may be transmitted to the first data latch (D Latch1) or the second data latch (D Latch2), and the threshold voltage distribution of L7 is verified to obtain a verification code of 1 or 0, and in the case that the verification code is 1, the verification is passed, then the MP data in the cache latch (C Latch) is released and the LP data of the next memory cell is stored.

S216: When the memory device 60 employs the second sub-mode Mode22 to perform a program operation, after the verification of a second part of the program states passes, the cache latch (C Latch) releases the buffered data corresponding to the program operation, and updates data corresponding to a next program operation into a part of the data latches (D Latch). The program state verification in the second part may be the same as the program state verification in the first part, and will not be repeated here.

For example, the number of program states corresponding to the first part is greater than the number of program states corresponding to the second part. In some examples, "the number of program states corresponding to the first part" and "the number of program states corresponding to the second part" are used to distinguish the fine-programmed data in different sub-modes, rather than dividing the fine-programmed data into two parts. Different sub-modes may be selected by determining an amount of fine-programmed data.

Thus, when there are a large number of un-stored program states (e.g., the program state of the first part), employing the first sub-mode Mode21 for program operations will occupy less resources of the processor (e.g., a memory controller) and increase the speed of data recovery.

For example, a time instance corresponding to the first sub-mode Mode 21 at which the cache latch (C Latch) releases the buffered data is later than a time instance corresponding to the second sub-mode at which the cache latch (C Latch) releases the buffered data.

Thus, based on the fact that the number of program states corresponding to the first part is greater than the number of program states corresponding to the second part, the cache latch (C Latch) in the first sub-mode Mode21 may cache data for a longer time to ensure that that the data in the cache latch (C Latch) is stored and then released, thereby reducing the probability of data loss and improving the accuracy of data recovery.

As an example, the storage type of the memory cell includes QLC, including 4 storage bits: LP, MP, UP, and XP. When the first sub-mode Mode21 is employed for program operation, the LP storage bit uses RAID for data recovery, and the MP, UP and XP storage bits (e.g., the first part of the data) stored in the data latch (D Latch) are obtained from the cache latch (C Latch) through the memory controller 51 and the recovered data re_Data is obtained.

For example, it can take 77 microseconds to transmit the data in the data latch (D Latch) to the cache latch (C Latch), it takes 77*3=231 microseconds to obtain MP, UP and XP three-digit data through the cache latch (C Latch) and perform data recovery, and it takes 150*5=750 microseconds for the RAID to recover data from one storage bit (LP). It takes 981 microseconds to recover data using the first sub-mode Mode21.

As another example, the storage type of the memory cell includes QLC, including 4 storage bits: LP, MP, UP, and XP. When the second sub-mode Mode22 is employed for program operation, the LP and MP storage bits use RAID for data recovery, and the UP and XP storage bits (e.g., the first part of the data) stored in the data latch (D Latch) are obtained from the cache latch (C Latch) through the memory controller 51 and the recovered data re_Data is obtained.

For example, it can take 77 microseconds to transmit the data in the data latch (D Latch) to the cache latch (C Latch), it takes 77*2=154 microseconds to obtain UP and XP three-digit data through the cache latch (C Latch) and perform data recovery, and it takes 150*5*2=1500 microseconds for the RAID to recover data from one storage bit (LP and MP). It takes 1654 microseconds to recover data using the second sub-mode Model22.

Thus, due to the large amount of data in the first part, the first sub-mode Model21 is used to obtain and recover the data re_Data from the cache latch (C Latch) through the memory controller 51, which is beneficial to improving the speed of obtaining un-stored data and reducing the overall time consumed by data recovery.

Meanwhile, for the same amount of data, after a large amount of data is obtained from the cache latch (C Latch) using the memory controller 51 and the recovered data re_Data is obtained, the remaining data is recovered using the independent redundant disk array RAID, thus, an amount of data recovery using RAID in the first sub-mode Model21 is less than an amount of data recovery using RAID in the second sub-mode Model22, thereby reducing the resources occupied by the processor (e.g., memory controller) and further reducing the time consumed by the recovery of all data in the memory cell.

In some examples, for the partial data described above corresponding to the data on which coarse program has been performed but fine program has not been performed, the original user data may be obtained by decoding the recovered data re_Data, and then the recovered data re_Data is obtained in conjunction with RAID, and then the recovered data re_Data is re-encoded.

For example, the memory controller 51 is configured to: decode the data of the storage bit corresponding to the data latch (D Latch) in which data has not been updated to acquire the user data for the storage bit corresponding to the data latch (D Latch) that has not been updated (e.g., the original data when there is no error in the program state). For example, the decoding method includes randomization encoding processing and/or error correction encoding processing.

The incorrect data of the storage bit corresponding to the data latch (D Latch) in which data has been updated is recovered with the user data for the storage bit corresponding to the data latch (D Latch) that has not been updated and in conjunction with employing the independent redundant disk array RAID, to acquire the user data for the storage bit corresponding to the data latch in which data has been updated (D Latch).

An amount of data recovered with an independent redundant disk array RAID when the memory device 60 employs the first sub-mode Model21 for a program operation is less than an amount of data recovered with an independent redundant disk array RAID when the memory device 60 employs the second sub-mode Model22 for a program operation.

Considering that the storage bit corresponding to the data latch (D Latch) in which data has not been updated, that is, the data on which coarse program has been performed but fine program has not been performed needs to be decoded to obtain original user data and needs to be combined with the recovered data obtained through RAID processing, as a result, the overall time consumption is long, therefore, in the case that there is a large amount of data on which coarse program has been performed but fine program has not been performed, and a small amount of data recovered using RAID, the first sub-mode Model21 may be used for program operation, which, compared with using the second sub-mode Model22 for program operations, can further reduce the resources occupied by the processor (e.g., the memory controller) and improve the speed of data recovery.

S300: as shown in FIG. 21, the control memory device 60 re-performs the program operation with the recovered data re_Data; and updates the logical physical mapping table after the re-program operation is completed.

For example, the data obtained by the reprogram operation using the recovered data re_Data is stored in the logical physical mapping table (e.g., stored in the buffer), and correct data with good storage properties is obtained, even if this a part of the recovered data re_Data is subsequently released or lost, the memory system 50 may still utilize the data within the logical-physical mapping table to perform other program operations.

In view of this, examples of the present disclosure provide a memory system and operating method thereof, readable storage medium, which may implement data recovery more quickly and improve the accuracy of the recovered data when the program operation state is wrong.

In an aspect, some examples of the present application provide a memory system, including a memory device and a memory controller coupled to the memory device. Wherein, the memory device includes a page buffer; the page buffer includes a latch.

The memory controller is configured to: in response to a program state being incorrect while the memory device performs a program operation, obtain data in the latch. At least part of recovered data is obtained with the obtained data in the latch.

In some examples, the memory device further includes a memory cell that stores multiple bits; the latch includes one or more data latches and a cache latch, wherein one data latch is configured to buffer one bit of data to be written to the memory cell; the cache latch is configured to buffer data for interaction between the memory device and the memory controller.

The memory controller is configured to: before obtaining the data in the latch, obtain information for representing a program mode of the memory device; the latches corresponding to the different program modes release buffered data at different times; according to the program mode, determine whether to control the memory device to transmit the data in the data latch to the cache latch, and obtain the data transmitted to the cache latch; wherein, before the data in the data latch is transmitted to the cache latch, a part of the recovered data is acquired with the buffered data in the cache latch.

In some examples, the memory controller is configured to: based on the program mode being a first mode, directly obtain the data in the cache latch and acquire at least a part of the recovered data; based on the program mode being a second mode, control the memory device to transmit the data in the multiple data latches to the cache latch respectively, and obtain the data transmitted from the multiple data latches to the cache latch, and acquire a part of the recovered data; and, before the data in the data latch is transmitted to the cache latch, acquire a part of the recovered data with the buffered data in the cache latch.

In some examples, a duration corresponding to the first mode for which the cache latch stores buffered data is longer than a duration corresponding to the second mode for which the cache latch stores buffered data.

In some examples, the program mode of the memory device is the first mode; when a program state being incorrect occurs during the program operation of the memory device, the data in the cache latch includes the data corresponding to the program operation.

The memory controller is configured to: acquire the recovered data of all the storage bits of the memory cell based on the data obtained directly from the cache latch.

In some examples, the program mode of the memory device is the second mode.

The program operation performed by the memory device includes a multi-pass program operation on a set of the memory cells. When a program state being incorrect occurs during the program operation on the set of the memory cells of the memory device, data in a part of the multiple data latches has been updated to data corresponding to a pass of program operation next to a current pass in the multi-pass program operation.

The memory controller is configured to: based on the data transmitted from the data latch to the cache latch, acquire the recovered data of the storage bit corresponding to the data latch in which data has not been updated; and recover incorrect data of the storage bit corresponding to the data latch in which data has been updated with an independent redundant disk array.

In some examples, the second mode includes a first sub-mode and a second sub-mode; a time instance corresponding to the first sub-mode at which the cache latch releases the buffered data is later than a time instance corresponding to the second sub-mode at which the cache latch releases the buffered data.

an amount of data recovered with an independent redundant disk array when the memory device performs a program operation with the first sub-mode is less than an amount of data recovered with an independent redundant disk array when the memory device performs a program operation with the second sub-mode.

In some examples, when the memory device performs a program operation with the first mode, after all program states pass verification, the cache latch releases the buffered data corresponding to the program operation.

When the memory device performs a program operation with the first sub-mode, after the verification of a first part of the program states pass, the cache latch releases the buffered data corresponding to the program operation, and updates data corresponding to a next program operation into a part of the data latches.

When the memory device performs a program operation with the second sub-mode, after the verification of a second part of the program states passes, the cache latch releases the buffered data corresponding to the program operation, and updates data corresponding to a next program operation into a part of the data latches.

Wherein, the number of program states corresponding to the first part is greater than the number of program states corresponding to the second part.

In some examples, the memory controller is configured to: send a first command based on the program mode being the second mode.

The memory device is configured to receive the first command and in response to the first command, transmit data in the multiple data latches to the cache latch respectively.

In some examples, the first command is configured by a setting feature command.

In some examples, the memory controller is configured to: decode the data of the storage bit corresponding to the data latch in which data has not been updated to acquire the user data for the storage bit corresponding to the data latch in which data has not been updated.

The incorrect data of the storage bit corresponding to the data latch in which data has been updated is recovered with the user data for the storage bit corresponding to the data latch in which data has not been updated and in conjunction with the independent redundant disk array, to acquire the user data for the storage bit corresponding to the data latch in which data has been updated.

The user data for all the storage bits is encoded, and the memory device is controlled to program the encoded data to a location different from a program location at which the program state being incorrect occurs.

In some examples, the memory controller includes a buffer; the memory controller is configured to: send a second command and a third command.

The memory device is configured to: receive the second command and in response to the second command, send data in the cache latch to the buffer; and receive the third command and in response to the third command, program the recovered data to a location different from a program location at which the program state being incorrect occurs.

In some examples, the memory device includes at least one memory chip; the memory chip includes at least one memory plane; the memory plane includes multiple memory blocks.

The memory controller is configured to: send a fourth command.

The memory device is configured to: receive the fourth command and in response to the fourth command, and program the recovered data from error into other memory blocks of the memory plane in which the program state being incorrect occurs.

In some examples, the memory controller is configured to: control the memory device to re-perform a program operation with the recovered data. The logical-physical mapping table is updated after the reprogram operation is completed.

In the memory system described above, compared with the method of only using the memory controller to control the recovery of incorrect data in the memory device, the present application can use the memory controller to directly recover the incorrect data of the memory device, e.g., the memory controller obtains at least a part of the recovered data by directly obtaining and utilizing the data in the latch in the memory device, which not only reduces the resource usage of the memory controller, but also requires less or no disks to reconstruct data, thus reducing the usage of other storage space, moreover, short delay helps to improve the speed of data recovery and reduce the error during data transmission thereby improving the accuracy of recovered data.

In another aspect, some examples of the present application provide a method for operating a memory system. The operating method includes: in response to a program state being incorrect occurring when a memory device of the memory system performs a program operation, obtaining data in a latch of a page buffer of the memory device. At least part of recovered data is obtained with the obtained data in the latch.

In some examples, the memory device further includes a memory cell that stores multiple bits; the page buffer further includes one or more data latches and a cache latch, wherein one data latch is configured to buffer one bit of data to be written to the memory cell respectively, the cache latch is configured to buffer data for interaction between the memory device and the memory controller.

The method further includes: before obtaining the data in the latch, obtaining information for representing a program mode of the memory device; the latches corresponding to the different program modes release buffered data at different times; according to the program mode, determining whether to control the memory device to transmit the data in the multiple data latches to the cache latch, and obtaining the data transmitted to the cache latch; wherein, before the data in the data latch is transmitted to the cache latch, a part of the recovered data is acquired with the buffered data.

In some example, the determining whether to control the memory device to transmit the data in the data latch to the cache latch according to the program mode includes: based on the program mode being a first mode, directly obtaining the data in the cache latch of the page buffer and acquiring at least a part of the recovered data.

Based on the program mode being a second mode, the memory device is controlled to transmit the data in the multiple data latches to the cache latch respectively, and obtain the data transmitted from the multiple data latches to the cache latch, and acquire a part of the recovered data; and, before the data in the data latch is transmitted to the cache latch, acquire a part of the recovered data with the buffered data in the cache latch.

In some examples, a duration corresponding to the first mode for which the cache latch stores buffered data is longer than a duration corresponding to the second mode for which the cache latch stores buffered data.

In some examples, the program mode of the memory device is the first mode; when a program state being incorrect occurs during the program operation of the memory device, the data in the cache latch includes the data corresponding to the program operation.

The method further includes: acquiring recovered data of all the storage bits of the memory cell based on the data obtained directly from the cache latch.

In some examples, the program mode of the memory device is the second mode. The program operation performed by the memory device includes a multi-pass program operation on a set of the memory cells. When a program state being incorrect occurs during the program operation on the set of the memory cells of the memory device, data in a part of the multiple data latches has been updated to data corresponding to a pass of program operation next to a current pass in the multi-pass program operation.

The method further includes: based on the data transmitted from the data latch to the cache latch, acquiring the recovered data of the storage bit corresponding to the data latch in which data has not been updated; and recovering incorrect data of the storage bit corresponding to the data latch in which data has been updated with an independent redundant disk array.

In some examples, the second mode includes a first sub-mode and a second sub-mode; a time instance corresponding to the first sub-mode at which the cache latch releases the buffered data is later than a time instance corresponding to the second sub-mode at which the cache latch releases the buffered data.

An amount of data recovered with an independent redundant disk array when the memory device performs a program operation with the first sub-mode is less than an amount of data recovered with an independent redundant disk array when the memory device performs a program operation with the second sub-mode.

In some examples, when the memory device performs a program operation with the first mode, after all program states pass verification, the cache latch releases the buffered data corresponding to the program operation.

When the memory device performs a program operation with the first sub-mode, after the verification of a first part of the program states passes, the cache latch releases the buffered data corresponding to the program operation, and updates data corresponding to a next program operation into a part of the data latches.

When the memory device performs a program operation with the second sub-mode, after the verification of a second part of the program states passes, the cache latch releases the buffered data corresponding to the program operation, and updates data corresponding to a next program operation into a part of the data latches; wherein the number of program states corresponding to the first part is greater than the number of program states corresponding to the second part.

In some examples, the method further includes: sending a first command based on the program mode being the second mode; the first command instructing the memory device to transmit data in the multiple data latches to the cache latch respectively.

In some examples, the first command is configured by a setting feature command.

In some examples, the method further includes: decoding the data of the data latch in which data has not been updated to acquire the user data for the storage bit corresponding to the data latch in which data has not been updated.

The incorrect data of the storage bit corresponding to the data latch in which data has been updated is recovered with the user data for the storage bit corresponding to the data latch in which data has not been updated and in conjunction with the independent redundant disk array, to acquire the user data for the storage bit corresponding to the data latch in which data has been updated.

The user data for all the storage bits is encoded, and the memory device is controlled to program the encoded data to a location different from a program location at which the program state being incorrect occurs.

In some examples, the method further includes: sending a second command and a third command based on the program mode being the first mode; the second command instructing the memory device to output data in a cache latch of the page buffer; the third command instructing the memory device to program the recovered data to a location different from a program location at which the program state being incorrect occurs.

In some examples, the memory device includes at least one memory chip; the memory chip includes at least one memory plane; the memory plane includes multiple memory blocks.

The method further includes: sending a fourth command based on the program mode being the first mode; the fourth command instructing the memory device to acquire the recovered data with the data in the buffer, and to program the recovered data into other memory blocks of the memory plane in which the program state being incorrect occurs.

In some examples, the method further includes: controlling the memory device to re-perform a program operation with the recovered data. The logical-physical mapping table is updated after the reprogram operation is completed.

The beneficial effects of the method for operating the memory system described above are the same as those of the memory system provided by any of the examples described above, and will not be repeated here.

In yet another aspect, some examples of the present disclosure provide a readable storage medium. The readable storage medium stores computer program that when executed, may implement the operating method or a memory system as in any one of the examples described above.

The beneficial effects of the readable storage medium described above are the same as those of the method for operating the memory system provided by any of the examples described above, and will not be repeated here.

The above is only specific implementations of the present disclosure, but the claimed scope of the present disclosure is not limited thereto, and changes or substitutions within the technical scope disclosed in the present disclosure that may be easily conceived by those skilled in the art shall fall within the claimed scope of the present disclosure. Therefore, the claimed scope of the present disclosure should be determined by the claimed scope of the claims.

What is claimed is:

1. A memory system, comprising:
a memory device, including a page buffer which includes a latch; and
a memory controller coupled to the memory device, and configured to:
    obtain information for representing a program mode of the memory device, wherein the latch releases buffered data at a different time under different program modes;
    in response to a program state being incorrect occurring when the memory device performs a program operation, obtain data in the latch; and
    acquire at least a part of recovered data with the obtained data in the latch.

2. The memory system of claim 1, wherein the memory device further includes a memory cell that stores multiple bits, and the latch includes one or more data latches and a cache latch, wherein a data latch of the one or more data latches is configured to buffer one bit of data to be written to the memory cell; and
the memory controller is configured to,
    according to the program mode, determine whether to control the memory device to transmit the data in the data latch to the cache latch, and obtain the data transmitted to the cache latch, wherein, before the data in the data latch is transmitted to the cache latch, a part of the recovered data is acquired with buffered data in the cache latch.

3. The memory system of claim 2, wherein the memory controller is further configured to:
based on the program mode being a first mode, directly obtain the data in the cache latch and acquire at least a part of the recovered data; and
based on the program mode being a second mode:
    control the memory device to transmit the data in the one or more data latches to the cache latch respectively;
    obtain the data transmitted from the one or more data latches to the cache latch;
    acquire a part of the recovered data; and
    before the data in the one or more data latches is transmitted to the cache latch, acquire a part of the recovered data with the buffered data in the cache latch.

4. The memory system of claim 3, wherein a duration corresponding to the first mode for which the cache latch stores buffered data is longer than a duration corresponding to the second mode for which the cache latch stores the buffered data.

5. The memory system of claim 3, wherein the program mode of the memory device is the first mode, and, when a program state being incorrect occurs during the program operation of the memory device, the data in the cache latch includes the data corresponding to the program operation; and the memory controller is configured to acquire recovered data of all storage bits of the memory cell based on the data obtained directly from the cache latch.

6. The memory system of claim 3, wherein the program mode of the memory device is the second mode, the program operation performed by the memory device includes a multi-pass program operation on a set of memory cells, and, when a program state being incorrect occurs during the program operation on the set of the memory cells of the memory device, data in a part of the one or more data latches has been updated to data corresponding to a pass of the program operation next to a current pass in the multi-pass program operation; and
the memory controller is configured to:
    based on the data transmitted from the data latch to the cache latch, acquire the recovered data of a storage bit corresponding to the data latch in which data has not been updated; and
    recover incorrect data of the storage bit corresponding to the data latch in which data has been updated with an independent redundant disk array.

7. The memory system of claim 6, wherein:
the second mode includes a first sub-mode and a second sub-mode, and a time instance corresponding to the first sub-mode at which the cache latch releases the buffered data is later than a time instance corresponding to the second sub-mode at which the cache latch releases the buffered data; and
an amount of data recovered with the independent redundant disk array when the memory device performs the program operation with the first sub-mode is less than an amount of data recovered with the independent redundant disk array when the memory device performs the program operation with the second sub-mode.

8. The memory system of claim 7, wherein the memory controller is configured to:
when the memory device performs the program operation with the first mode, after a verification of all program states passes, the cache latch releases the buffered data corresponding to the program operation;
when the memory device performs the program operation with the first sub-mode, after a verification of a first part of the program states passes, the cache latch releases the buffered data corresponding to the program operation, and updates data corresponding to a next program operation into a part of the data latches; and
when the memory device performs the program operation with the second sub-mode, after a verification of a second part of the program states passes, the cache latch releases the buffered data corresponding to the program operation, and updates data corresponding to a next program operation into a part of the data latches,
wherein a number of program states corresponding to the first part is greater than a number of program states corresponding to the second part.

9. The memory system of claim 6, wherein the memory controller is configured to:
send a first command based on the program mode being the second mode; and
the memory device is configured to receive the first command and, in response to the first command, transmit data in the one or more data latches to the cache latch respectively.

10. The memory system of claim 9, wherein the first command is configured by a setting feature command.

11. The memory system of claim 6, wherein the memory controller is configured to:

decode the data of the storage bit corresponding to the data latch in which data has not been updated to acquire user data for the storage bit corresponding to the data latch in which data has not been updated;

recover the incorrect data of the storage bit corresponding to the data latch in which data has been updated with the user data for the storage bit corresponding to the data latch in which data has not been updated, in conjunction with the independent redundant disk array, to acquire the user data for the storage bit corresponding to the data latch in which data has been updated; and encode the user data for all storage bits, and control the memory device to program the encoded data to a location different from a program location at which the program state being incorrect occurs.

12. The memory system of claim 5, wherein the memory controller includes a buffer, and the memory controller is configured to send a second command and a third command;

the memory device is configured to:

receive the second command and, in response to the second command, send data in the cache latch to the buffer; and receive the third command and, in response to the third command, program the recovered data to a location different from a program location at which the program state being incorrect occurs.

13. The memory system of claim 12, wherein the memory device includes at least one memory chip, the memory chip includes at least one memory plane, and the memory plane includes memory blocks;

the memory controller is configured to send a fourth command; and the memory device is configured to:

receive the fourth command; and in response to the third command, program the recovered data into other memory blocks.

14. The memory system of claim 11, wherein the memory controller is configured to:

control the memory device to re-perform the program operation with the recovered data; and update a logical-physical mapping table after the re-performance of the program operation is completed.

15. A method of operating a memory system, comprising:

obtaining information for representing a program mode of a memory device of the memory system, wherein a latch of a page buffer of the memory device releases buffered data at a different time under different program modes;

in response to a program state being incorrect occurring when the memory device performs a program operation, obtaining data in the latch; and acquiring at least a part of recovered data with the obtained data in the latch.

16. The method of claim 15, wherein the memory device further includes a memory cell that stores multiple bits, and the latch includes one or more data latches and a cache latch, wherein a data latch of the one or more data latches is configured to buffer one bit of data to be written to the memory cell respectively; and the method further includes, according to the program mode, determining whether to control the memory device to transmit the data in the one or more data latches to the cache latch, and obtaining the data transmitted to the cache latch, wherein, before the data in the data latch is transmitted to the cache latch, a part of the recovered data is acquired with buffered data.

17. The method of claim 16, wherein, the determining whether to control the memory device to transmit the data in the one or more data latches to the cache latch according to the information for the program mode includes:

based on the program mode being a first mode, directly obtaining the data in the cache latch of the page buffer and acquiring at least a part of the recovered data; and based on the program mode being a second mode:

controlling the memory device to transmit the data in the one or more data latches to the cache latch respectively;

obtaining the data transmitted from the one or more data latches to the cache latch;

acquiring a part of the recovered data; and before the data in the data latch is transmitted to the cache latch, acquiring a part of the recovered data with the buffered data in the cache latch.

18. The method of claim 17, wherein a duration corresponding to the first mode for which the cache latch stores buffered data is longer than a duration corresponding to the second mode for which the cache latch stores the buffered data.

19. The method of claim 17, wherein the program mode of the memory device is the first mode, and, when the program state being incorrect occurs during the program operation of the memory device, the data in the cache latch includes the data corresponding to the program operation; and the method further includes acquiring recovered data of all storage bits of the memory cell based on the data obtained directly from the cache latch.

20. A non-transitory computer-readable storage medium, wherein the non-transitory computer-readable storage medium stores a computer program that when executed, implements a method for operating a memory system, comprising:

obtaining information for representing a program mode of a memory device of the memory system, wherein a latch of a page buffer of the memory device releases buffered data at a different time under different program modes;

in response to a program state being incorrect occurring when the memory device performs a program operation, obtaining data in the latch; and acquiring at least a part of recovered data with the obtained data in the latch.

* * * * *